(12) United States Patent
Nebashi

(10) Patent No.: US 7,887,282 B2
(45) Date of Patent: Feb. 15, 2011

(54) MEDIA TRANSPORTATION MECHANISM AND MEDIA PROCESSING DEVICE HAVING THE MEDIA TRANSPORTATION MECHANISM

(75) Inventor: Mitsuhiko Nebashi, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 399 days.

(21) Appl. No.: 12/121,572

(22) Filed: May 15, 2008

(65) Prior Publication Data

US 2008/0286085 A1 Nov. 20, 2008

(30) Foreign Application Priority Data

May 18, 2007 (JP) .............................. 2007-133466

(51) Int. Cl.
*B25J 18/00* (2006.01)
(52) U.S. Cl. .............. 414/744.2; 294/907; 324/207.26; 901/35
(58) Field of Classification Search .............. 414/744.2, 414/744.3, 744.8; 294/907; 324/207.26; 901/35
See application file for complete search history.

(56) References Cited

U.S. PATENT DOCUMENTS 6,065,789 A * 5/2000 Nagai et al. ................. 294/64.1

2007/0280057 A1 12/2007 Ikeda

FOREIGN PATENT DOCUMENTS

| JP | 05125642 | 5/1993 |
| JP | 10291687 | 11/1998 |
| JP | 2006202379 | 8/2006 |

* cited by examiner

*Primary Examiner*—Donald Underwood
(74) *Attorney, Agent, or Firm*—Mark P. Watson

(57) ABSTRACT

A media transportation mechanism and a media processing device enabling carrying media without transportation errors or picking errors by accurately detecting if media is present. A media transportation mechanism 31 has a gripping mechanism 130 for holding media and a media detection mechanism 200 for detecting media gripped by the gripping mechanism 130 positioned on a transportation arm 36 that can move up and down. The media detection mechanism 200 has a detection lever 201 that is pivotably supported on the arm base 125a of the transportation arm 36 and is displaced from a media-not-detected position in contact with the arm base 125a to a media-detected position separated from the arm base 125a when the detection lever 201 contacts the media, a detector 202 that detects displacement of the detection lever 201 to the media-detected position, and an attraction unit including a magnet 203 and steel plate 204 that pull the arm base 125a and detection lever 201 together using magnetic force.

12 Claims, 31 Drawing Sheets

MEDIA TRANSPORTATION MECHANISM AND MEDIA PROCESSING DEVICE HAVING THE MEDIA TRANSPORTATION MECHANISM

CROSS-REFERENCE TO RELATED APPLICATIONS

Japanese Patent application No. 2007-133466, is hereby incorporated by reference in its entirety.

BACKGROUND OF THE INVENTION

1. Field of Invention

The present invention relates to a media transportation mechanism for carrying disc media such as CDs and DVDs, and to a media processing device having the media transportation mechanism.

2. Description of Related Art

Media processing systems such as disc duplicators that write data to large numbers of blank CDs, DVDs, and similar media, and CD/DVD publishers that both write the data and print a label to produce finished media, are now widely available. Such media processing devices generally have a drive for writing data to the media, a printer for printing on the label side of the media, and a media transportation mechanism for gripping and conveying the media to the drive and printer. See, for example, Japanese Unexamined Patent Appl. Pub. JP-A-2006-202379.

A media detection mechanism is positioned on the gripping mechanism located at the distal end of an arm of the media transportation mechanism. The media detection mechanism includes a lever that swings when then the media (also referred to as simply a disc below) is contacted when picking the media up, and a sensor that detects this movement of the lever. The media detection mechanism detects whether a disc is held by the gripping mechanism.

The lever of this media detection mechanism may rock due to inertia when the arm of the media transportation mechanism moves, or due to vibrations when the gripping mechanism operates.

This can result in the media detection mechanism erroneously detecting that a disc is present regardless of whether a disc is actually held by the gripping mechanism, and can thus result in media transportation errors.

A spring or other urging member might be used to urge the lever to the media, but the force of the urging member on the lever applies pressure to the media and thus makes the media pickup unit more susceptible to disc picking (gripping) errors.

SUMMARY OF THE INVENTION

A media transportation mechanism and a media processing device having the media transportation mechanism according to the present invention detect if media is present with high precision and can thereby convey the media without transportation errors, picking errors, or other such problems.

A media transportation mechanism according to a preferred aspect of the invention has a gripping mechanism that is positioned on a transportation arm and holds media, and a detection mechanism that detects if media is present in the gripping mechanism. The detection mechanism includes a detection lever having a detection probe that can contact the media, the detection lever being displaceable from a media-not-detected position to a media-detected position when the detection probe touches the media, a detector that detects displacement of the detection lever to the media-detected position, and an attraction unit that pulls the detection lever to the media-not-detected position using magnetism.

The attraction unit of this media transportation mechanism pulls the detection lever of the detection mechanism to the base plate and holds the detection lever in the media-not-detected position, thereby preventing displacement of the detection lever by inertia when the transportation arm moves or by vibration or other noise when the gripping mechanism is driven. Media picking and transportation errors caused by falsely detecting that a disc is present regardless of whether media is actually present can thus be reliably prevented.

Compared with an arrangement in which a spring or other urging member urges the detection lever to the arm base and holds the detection lever in the media-not-detected position, the detection lever is not pressed by an urging force against the disc held by the gripping mechanism, and the gripping mechanism is thus prevented from not getting a good grip on the disc.

The media can thus be transported without transportation errors, gripping errors, or other problems because the media detection mechanism can accurately detect if media is present.

In another aspect of the invention the detection lever has the detection probe on one end and the other end is pivotably supported on the transportation arm.

Further preferably, the media-not-detected position is the position where the detection probe protrudes from the transportation arm to the side on which the media is held, and the media-detected position is a position where protrusion of the detection probe is less than in the media-not-detected position.

This arrangement affords a simple construction whereby the detection probe is moved to the media-not-detected position or the media-detected position depending on whether media is present.

Further preferably, the attraction unit has a magnet positioned on either the base plate of the transportation arm or the detection lever, and an attracted member that is attracted to the magnet and is positioned on the other of the base plate of the transportation arm and the detection lever.

The attraction unit can thus be rendered using a low cost magnet and a member such as a piece of iron or magnetic stainless steel that is attracted by the magnet, and a media detection mechanism that is precise and free of detection errors can be provided at a low cost.

Further preferably, the attraction unit and the attracted member are positioned away from each other when the gripping mechanism holds the media.

The gripping mechanism can steadily hold the media because the only force applied when the detection lever is moved down is the detection lever's own weight.

Further preferably, the magnet and the attracted member of the attraction unit stick together when the detection lever is in the media-not-detected position.

When the detection lever is in the media-not-detected position, the detection lever is held by the attraction unit in a prescribed position by this aspect of the invention, and the detection lever can be held reliably at the media-not-detected position.

Further preferably, the magnet is positioned on a position that is close to the side of the detection probe than to a side of a detection lever guide shaft pivotally supporting the detector lever.

By positioning the magnet away from the pivot point of the detection lever a smaller force is required to separate the magnet from the attracted member.

Yet further preferably, the magnet is a plastic magnet having a magnetic body mixed in plastic.

By using an easily moldable plastic magnet, the magnet can easily be molded and shaped according to the installation, thereby lowering the manufacturing cost.

A media processing device according to another aspect of the invention has the media transportation mechanism herein, a media storage unit, and a media processing unit.

The media processing device according to the present invention can thus carry media from the media storage unit to a media processing unit, for example, without media transportation or picking errors, and can thus process media with high reliability.

Other objects and attainments together with a fuller understanding of the invention will become apparent and appreciated by referring to the following description and claims taken in conjunction with the accompanying drawings.

DESCRIPTION OF PREFERRED EMBODIMENTS

A preferred embodiment of a media transportation mechanism and a media processing device having the media transportation mechanism according to the present invention is described below with reference to the accompanying figures.

Note that the following embodiment of the invention is described using a disc publisher as an example of the media processing device of the invention.

Figure 1:
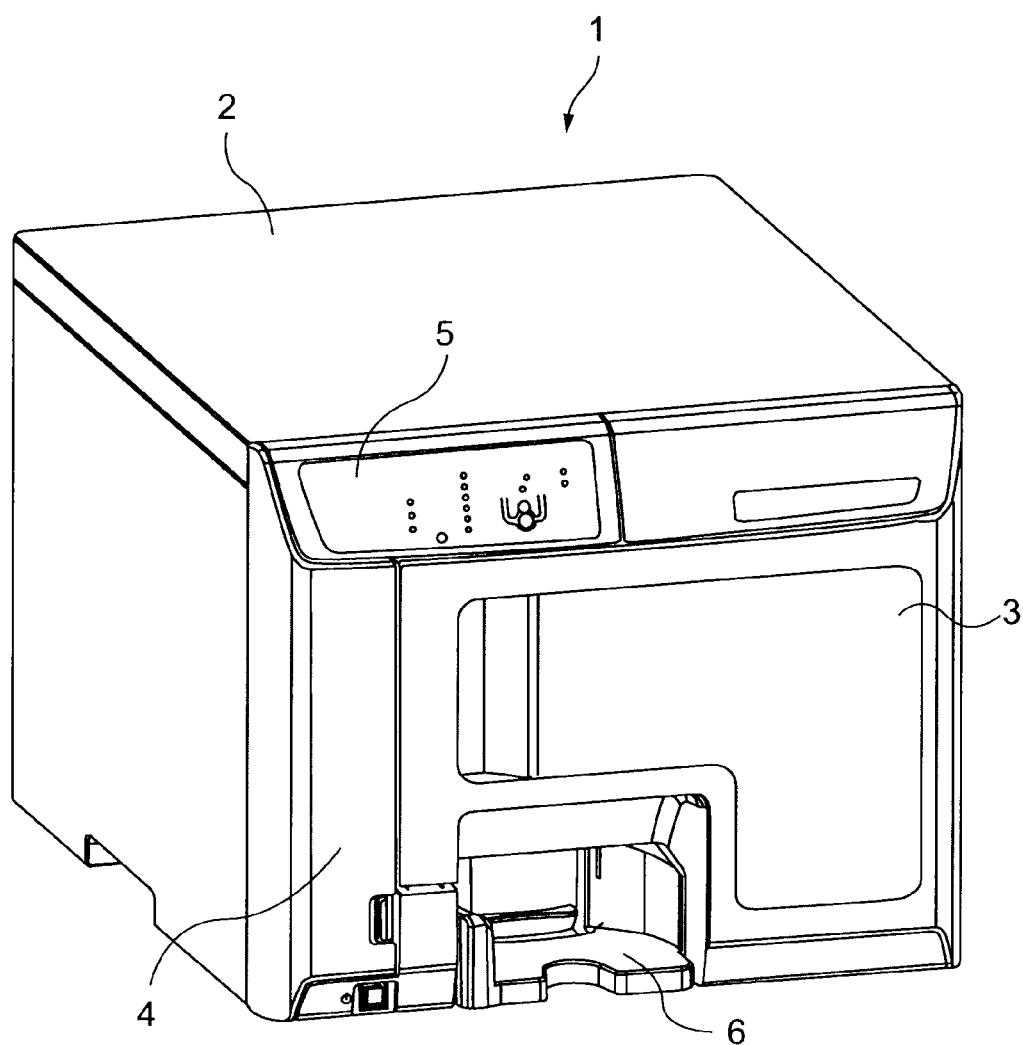
FIG. 1 is an oblique view of a disc publisher (media processing device).
Figure 2:
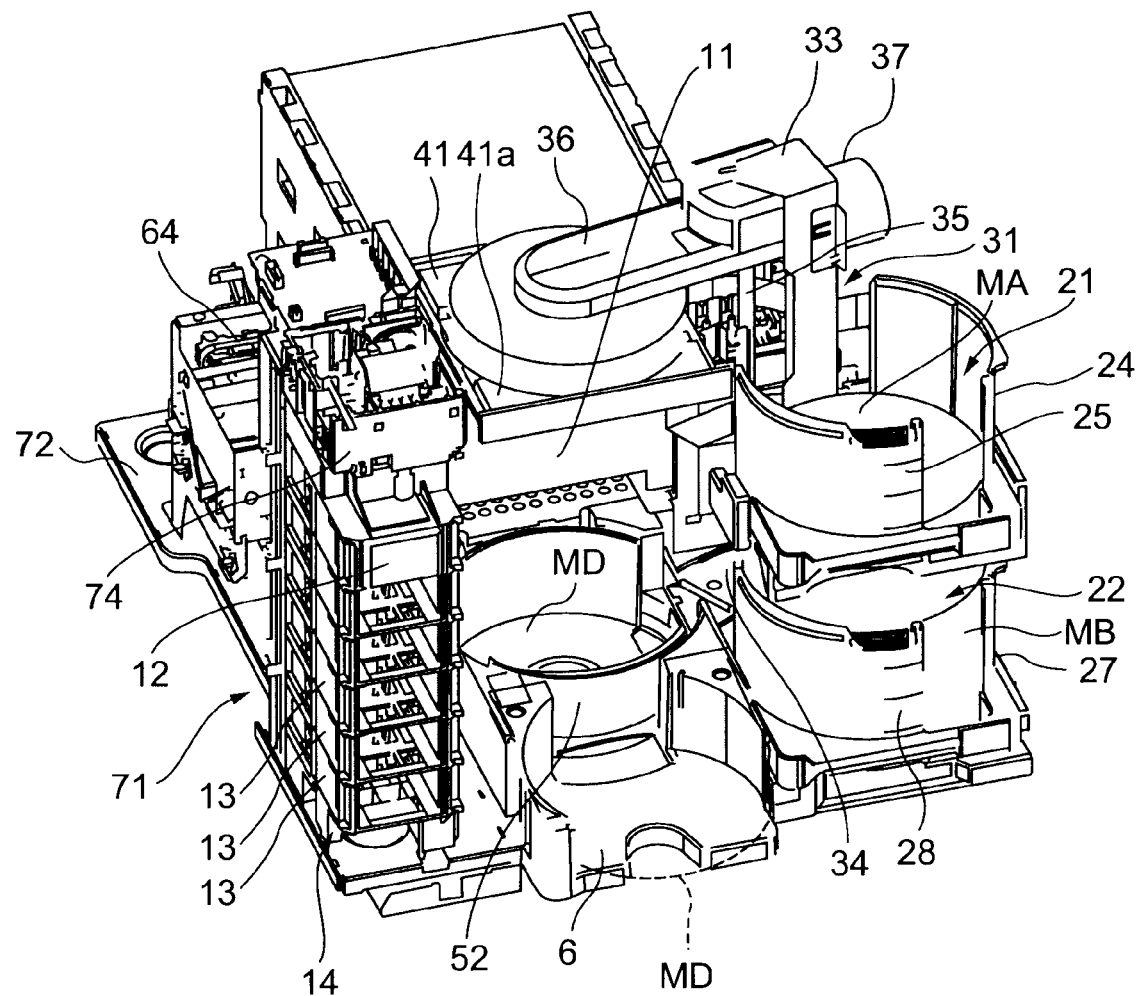
FIG. 2 is an oblique view from the front of the disc publisher with the disc publisher case removed.
Figure 3:
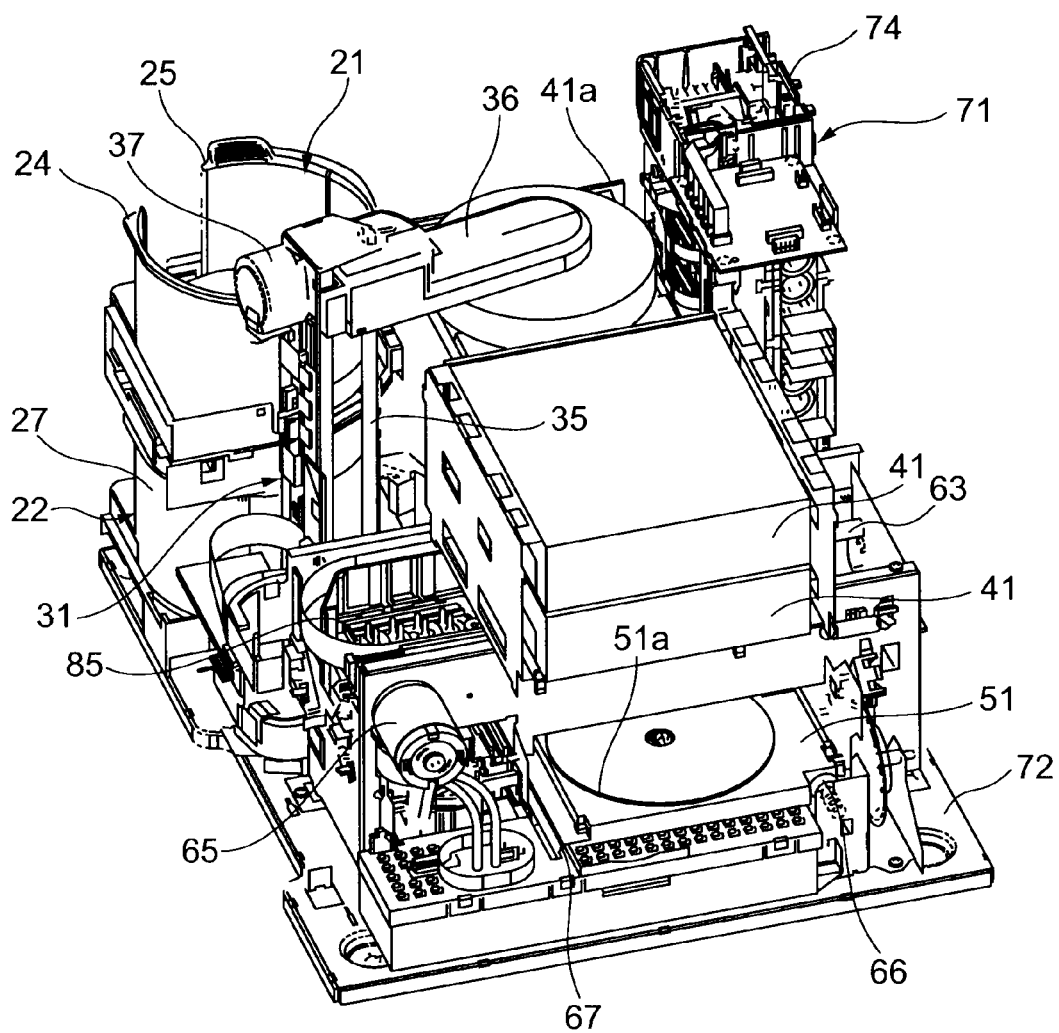
FIG. 3 is an oblique view from the back of the disc publisher with the case removed.
Figure 4:
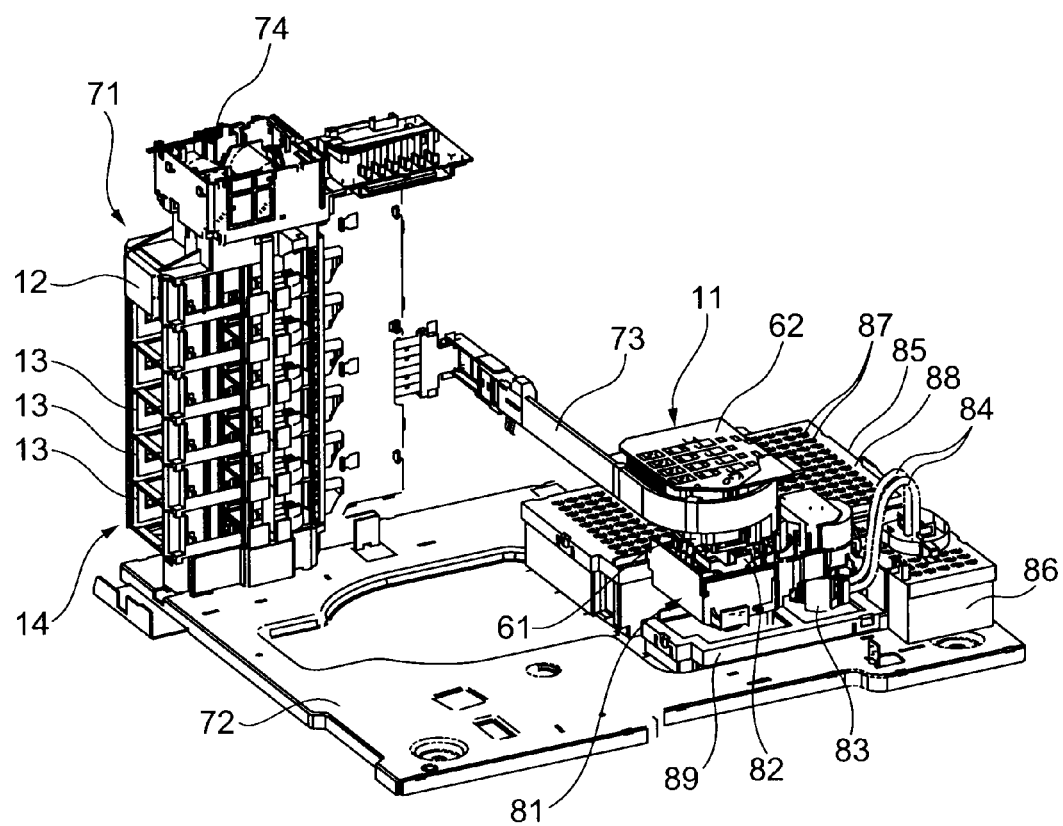
FIG. 4 is an oblique view of the label printer unit installed in the disc publisher.

FIG. 1 is an oblique view of the disc publisher (media processing device), FIG. 2 is an oblique view from the front of the disc publisher with the disc publisher case removed, FIG. 3 is an oblique view from the back of the disc publisher with the case removed, and FIG. 4 is an oblique view of the label printer unit installed in the disc publisher.

The disc publisher 1 is a media processing device that writes data and prints on the label side of disc-shaped media such as CDs and DVDs, and has a basically box-shaped case 2. Doors 3 and 4 the open and close to the right and left are attached at the front of the case 2. An operating panel 5 having various indicators and operating buttons is positioned at the top left part of the case 2, and a media exit 6 is positioned at the bottom of the case 2.

The door 3 at the front right side opens and closes to load unused blank media (referred to below as discs) MA and to remove completed discs MB.

The door 4 on the front left side opens and closes for replacing the ink cartridges 12 of the label printer 11. When the door 4 is open, a cartridge carrier unit 14 (see FIG. 2) with a plurality of cartridge holders 13 arrayed in a vertical stack is exposed.

As shown in FIG. 2, a blank media stacker 21 and a completed media stacker 22 are positioned coaxially one above the other inside the case 2 of the media processing device 1. The blank media stacker 21 is a media storage unit for holding a plurality of unused blank discs MA to which data has not been written in a vertical stack. The completed media stacker 22 is a media storage unit for similarly holding completed discs MB. The blank media stacker 21 and the completed media stacker 22 can be freely installed to and removed from the positions shown in FIG. 2.

The blank media stacker 21 has a pair of right and left curved side walls 24 and 25. The blank discs MA are placed from the top into the blank media stacker 21 between the side walls 24 and 25, which hold the discs in a substantially coaxial stack. The task of storing or adding the blank discs MA to the blank media stacker 21 can be done easily by opening the door 3 and pulling the stacker out.

The completed media stacker 22 located on the bottom is identically constructed with a pair of right and left curved side walls 27 and 28, enabling the completed discs MB to be inserted from the top and stored in a substantially coaxial stack.

The completed discs MB (that is, media for which writing data and printing the label side is finished) can also be removed by opening the door 3.

A media transportation mechanism 31 is located behind the blank media stacker 21 and the completed media stacker 22. The media transportation mechanism 31 has a vertical guide shaft 35 positioned between a horizontal support plate 34 attached to the base 72 and the top plate 33 of the chassis 32 (see FIG. 5). A transportation arm 36 is supported so that it can move up and down and rotate on the vertical guide shaft 35. The transportation arm 36 can move vertically up and down along the vertical guide shaft 35 and can pivot right and left on the vertical guide shaft 35 using a drive motor 37. Media carried to the media exit 6 by the media transportation mechanism 31 can be removed to the outside from the media exit 6.

Two media drives 41, also referred to as media processing units, are positioned one above the other beside the two stackers 21 and 22 and the media transportation mechanism 31, and the carriage 62 (see FIG. 4) of the label printer 11 is positioned movably below the media drives 41.

Each of the media drives 41 has a media tray 41a, which can move between a data writing position where data is recorded to the discs, and a media transfer position where the media can be loaded and unloaded from the media tray 41a.

The label printer 11, which is the media processing unit, also has a media tray 51 that can move between a printing position for printing a label on the label side of the media, and a media transfer position where the media can be loaded and unloaded from the media tray 51.

FIG. 2 and FIG. 3 show the media tray 41a of the upper media drive 41 pulled out to the media transfer position, and the media tray 51 of the label printer 11 on the bottom at the inside label printing position.

The label printer 11 in this example is an inkjet printer that uses color ink cartridges 12 (for six colors, specifically, black, cyan, magenta, yellow, light cyan, and light magenta) as the ink supply mechanism 71. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the blank media stacker 21 and between the pair of right and left side walls 27 and 28 of the completed media stacker 22. A space is also formed between the top and bottom blank media stacker 21 and completed media stacker 22 so that the transportation arm 36 of the media transportation mechanism 31 can pivot horizontally for positioning directly above the completed media stacker 22. When the media tray 41a is pushed into the media drive 41, the transportation arm 36 of the media transportation mechanism 31 descends and can access the media tray 51 in the media transfer position. Media can thus be conveyed to different stations by raising, lowering, and pivoting the transportation arm 36 right and left as needed.

A discard stacker 52 for storing discarded discs MD is located below the media transfer position of the media tray 51. In this embodiment of the invention the discard stacker 52 can hold approximately thirty discarded discs MD. The transportation arm 36 of the media transportation mechanism 31 can deliver a discarded disc MD into the discard stacker 52 when the media tray 51 has been moved to the data writing position from the media transfer position above the discard stacker 52.

This arrangement enables the transportation arm 36 of the media transportation mechanism 31 to carry CDs, DVDs, and similar media M (collectively referred to below as media M) between the blank media stacker 21, the completed media stacker 22, the discard stacker 52, media tray 41a of the media drive 41, and the media tray 51 of the label printer 11.

The label printer 11 has a carriage 62 with an inkjet head 61 having nozzles (not shown in the figure) for discharging ink. The carriage 62 moves bidirectionally horizontally along a carriage guide shaft using the drive power from a carriage motor (not shown in the figure).

The label printer 11 has an ink supply mechanism 71 with a cartridge carrier unit 14 in which the ink cartridges 12 are installed. The ink supply mechanism 71 is vertically constructed and is attached perpendicularly to the base 72 of the publisher 1. One end of a flexible ink supply tube 73 is connected to the ink supply mechanism 71, and the other end of the ink supply tube 73 is connected to the carriage 62.

Ink in the ink cartridges 12 loaded in the ink supply mechanism 71 is supplied through the ink supply tube 73 to the carriage 62. The ink is supplied to the inkjet head 61 through the damper unit and back pressure adjustment unit (not shown in the figure) positioned on the carriage 62, and discharged from the ink nozzles (not shown in the figure).

A pressurizing mechanism 74 is positioned on the ink supply mechanism 71 with the main part of the pressurizing mechanism 74 at the top of the ink supply mechanism 71. This pressurizing mechanism 74 supplies compressed air to pressurize the inside of the ink cartridge 12 and expel ink from the ink pack in the ink cartridge 12.

A head maintenance mechanism 81 is positioned below the home position (shown in FIG. 4) of the carriage 62.

The head maintenance mechanism 81 has a head cap 82 and a waste ink suction pump 83. The head cap 82 covers the ink nozzles of the inkjet head 61 exposed below the carriage 62 in the home position. The waste ink suction pump 83 vacuums ink discharged into the head cap 82 by the ink charging operation and the head cleaning operation of the inkjet head 61.

Ink that is removed by the waste ink suction pump 83 of the head maintenance mechanism 81 is discharged through another tube 84 into the waste ink absorption tank 85. This waste ink absorption tank 85 is an absorbent material positioned inside the case 86, and has a cover 88 with numerous ventilation holes 87.

A waste ink catch pan 89 that is a part of the waste ink absorption tank 85 is positioned below the head maintenance mechanism 81 to catch and absorb ink that drips from the head maintenance mechanism 81 with an absorbent material.

*Media Transportation Mechanism

Figure 5:
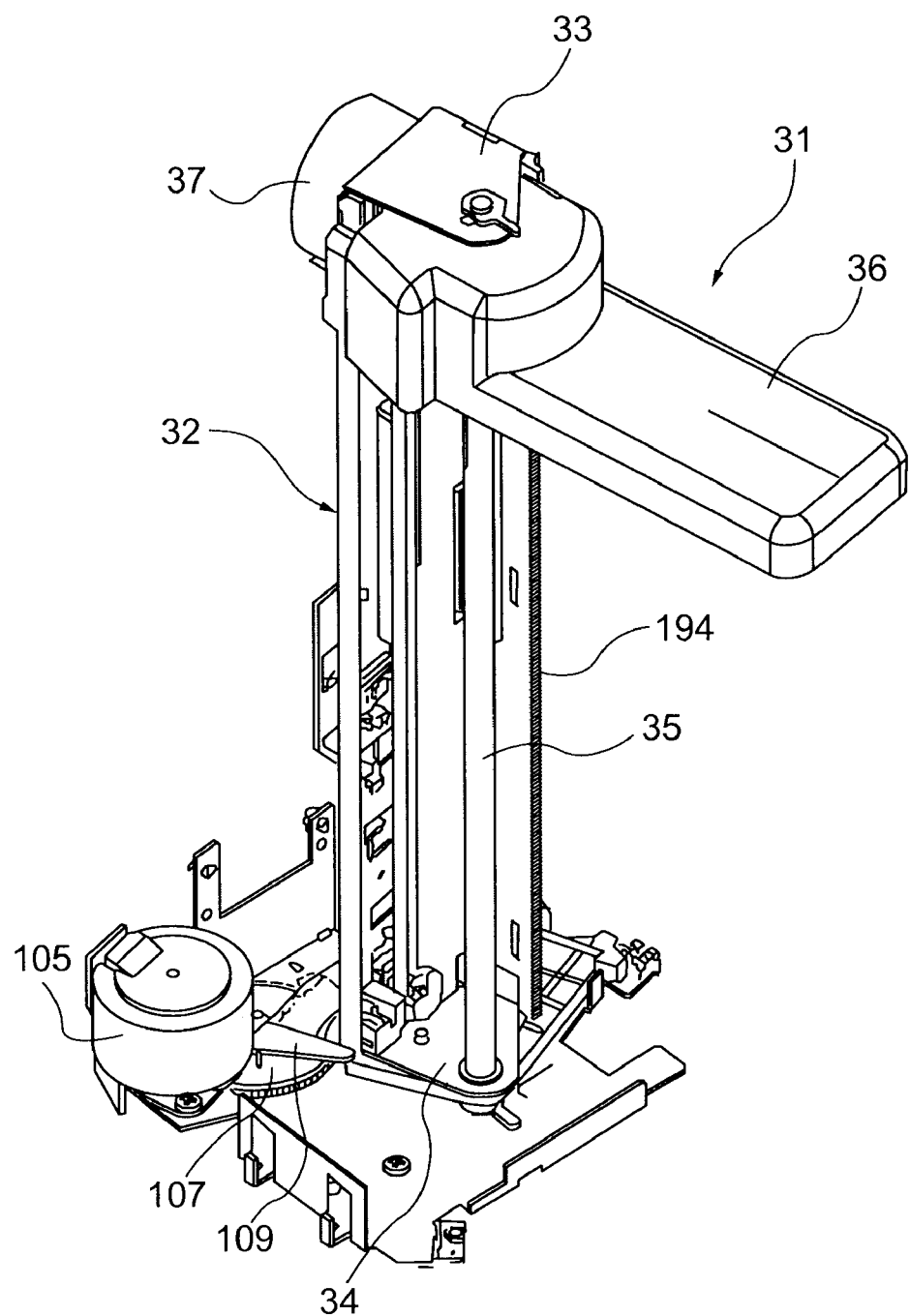
FIG. 5 is an oblique view of the media transportation mechanism.
Figure 6:
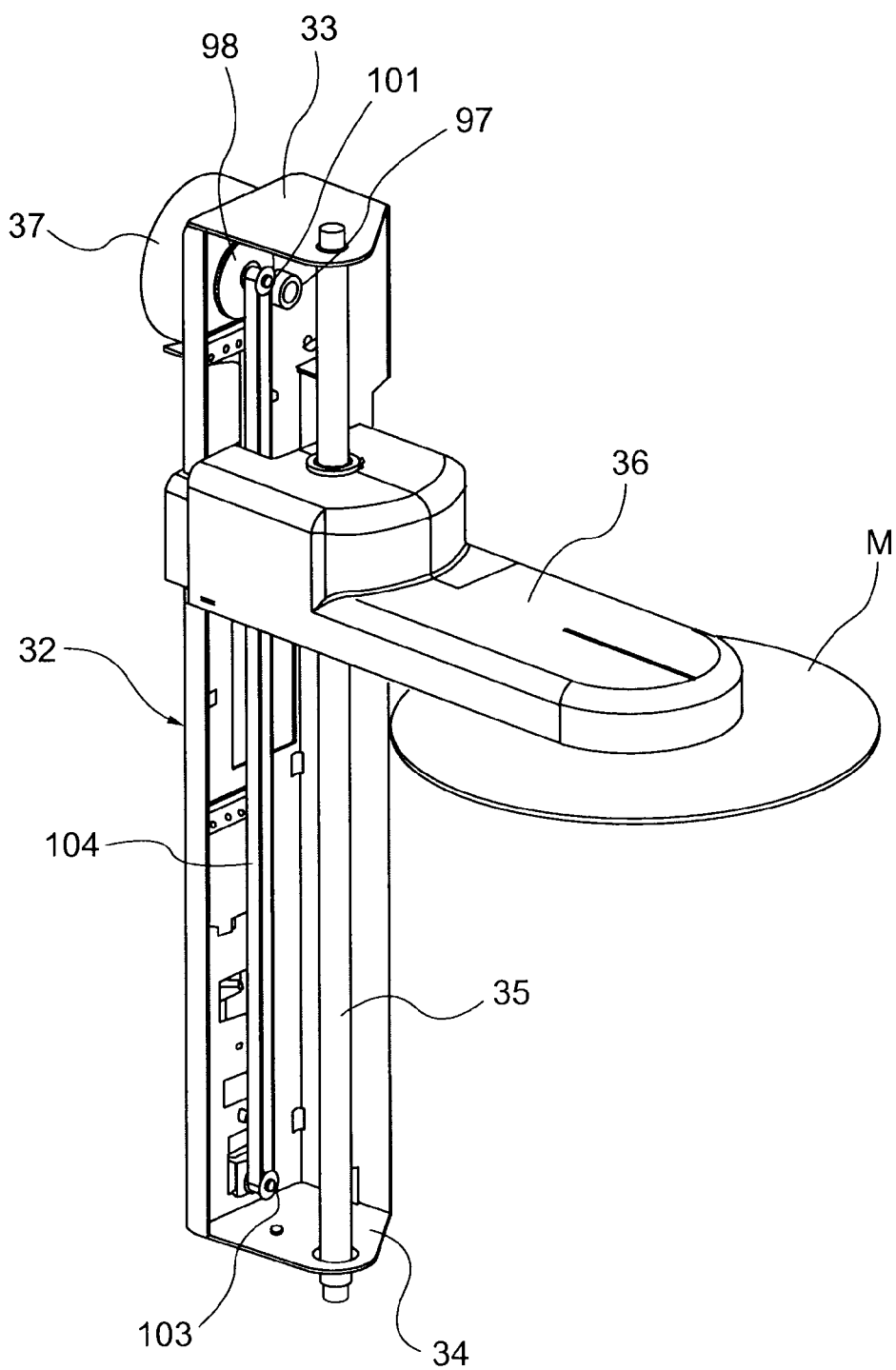
FIG. 6 is an oblique view of a part of the media transportation mechanism.
Figure 7:
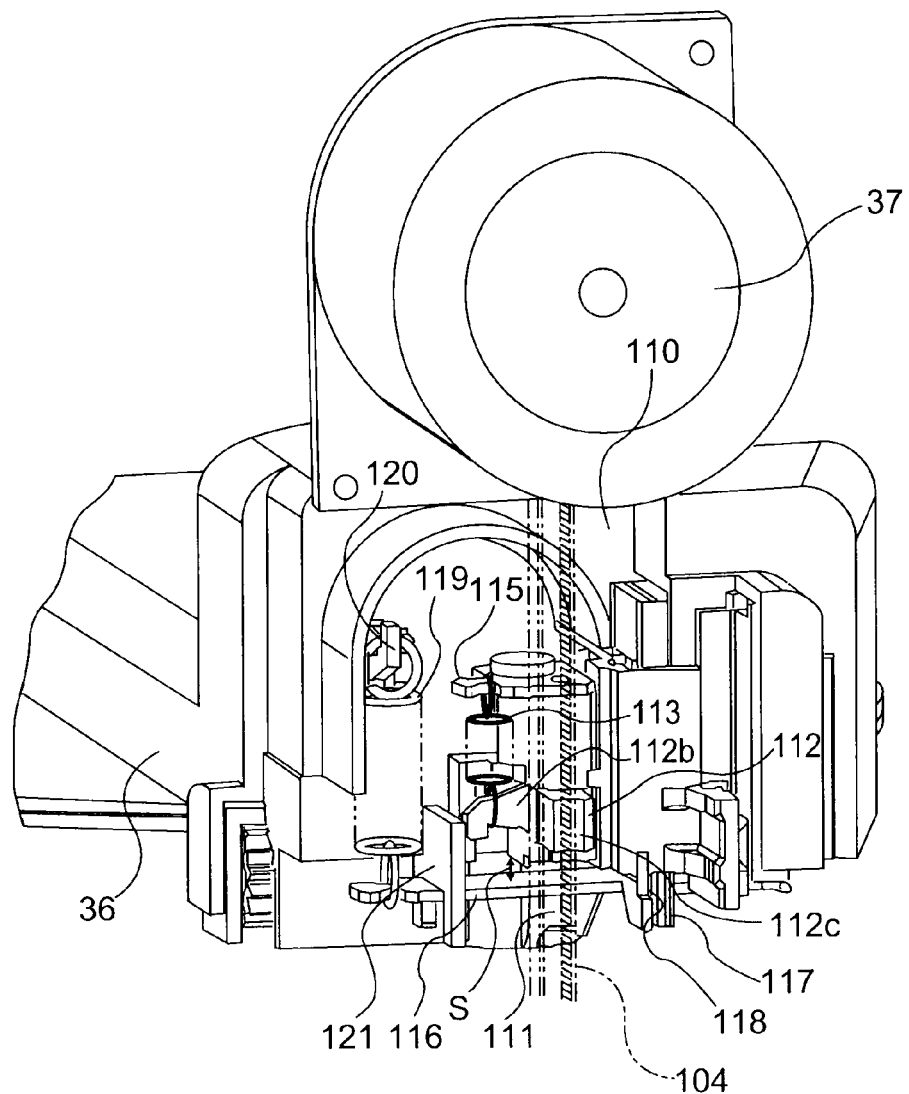
FIG. 7 is an oblique view of the linkage mechanism between the transportation arm and the timing belt.

FIG. 5 is an oblique view of the media transportation mechanism, FIG. 6 is an oblique view of a part of the media transportation mechanism, and FIG. 7 is an oblique view showing the linkage mechanism between the transportation arm and the timing belt.

As shown in FIG. 5 the media transportation mechanism 31 has a chassis 32 that is fastened vertically, and a vertical guide shaft 35 connected between the support plate 34 fastened to the base 72 and the top plate 33 of the chassis 32. The transportation arm 36 is supported so that it can move vertically and pivot horizontally on the vertical guide shaft 35.

As shown in FIG. 6, the elevator mechanism of the transportation arm 36 has a drive motor 37 that is the drive power source for raising and lowering the transportation arm 36. Torque from the drive motor 37 is transferred to a drive pulley 101 using a pinion 97 attached to the output shaft of the drive motor 37 and a transfer gear 98. The drive pulley 101 is supported freely rotatably on a horizontal rotating shaft near the top end of the chassis 32. A driven pulley 103 is supported freely rotatably on another horizontal rotating shaft near the bottom end of the chassis 32. A timing belt 104 travels around the drive pulley 101 and the driven pulley 103. The base 110 of the transportation arm 36 is connected by a belt clip 112 to the left or right side of the timing belt 104 as shown in FIG. 7.

As a result, when the drive motor 37 is driven, the timing belt 104 moves vertically and the transportation arm 36 attached to the timing belt 104 travels up or down along the vertical guide shaft 35.

As shown in FIG. 5, the pivot mechanism of the transportation arm 36 has a drive motor 105 as the drive power source for swinging the transportation arm 36 horizontally. A pinion (not shown in the figure) is attached to the output shaft of the drive motor 105, and rotation of the pinion is transferred through a speed-reducing gear train including a transfer gear 107 to a fan-shaped end gear 109. This fan-shaped end gear 109 can rotate right and left on the vertical guide shaft 35. The chassis 32 on which the component parts of the elevator mechanism of the transportation arm 36 are assembled is mounted on the end gear 109. When the drive motor 105 is driven the fan-shaped end gear 109 moves rotationally left and right, and the chassis 32 mounted thereon pivots in unison left and right on the vertical guide shaft 35. As a result, the transportation arm 36 supported by the elevator mechanism mounted on the chassis 32 swings left and right on the vertical guide shaft 35.

The support structure of the transportation arm 36 is described next.

Figure 8:
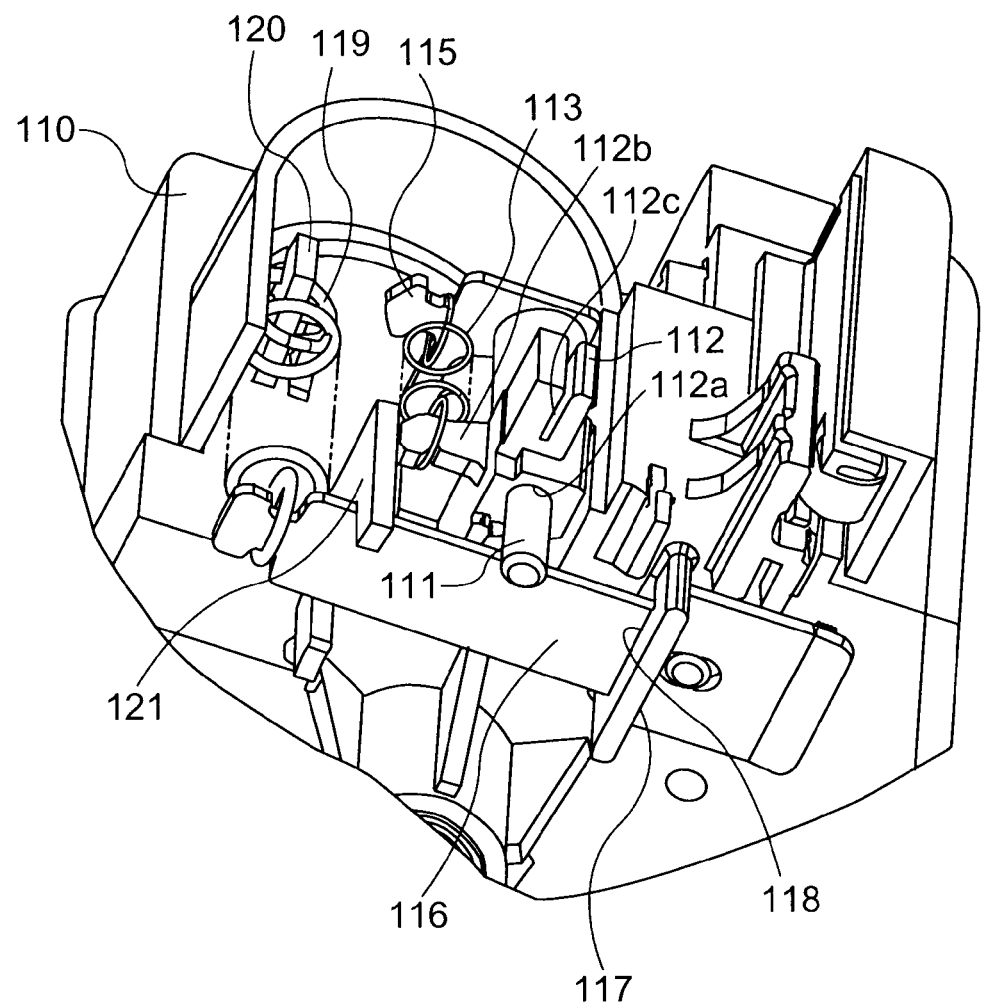
FIG. 8 is an enlarged oblique view from below of the linkage mechanism between the transportation arm and the timing belt.

FIG. 8 is an enlarged oblique view from below of the assembly shown in FIG. 7.

As shown in FIG. 7 and FIG. 8 a slide shaft 111 is positioned on the base 110 of the transportation arm 36 in a vertical orientation. The slide shaft 111 is inserted slidably through a guide hole 112a in the belt clip 112 that holds the timing belt 104. This enables the belt clip 112 to slide vertically along the slide shaft 111.

A catch 112b is formed to the belt clip 112, and this catch 112b is connected to one end of a first tension spring 113, which is a coil spring. The other end of the first tension spring 113 is connected to a stationary catch 115 positioned on the base 110 of the transportation arm 36 above the catch 112b. The force of the first tension spring 113 thus works to pull the belt clip 112 up.

The belt clip 112 also has a stationary part 112c that secures the timing belt 104.

A pressure lever 116 is located below the belt clip 112. This pressure lever 116 is inserted from the side through an opening 118 formed in a support plate 117 positioned on the bottom of the base 110 of the transportation arm 36 beside the belt clip 112, and can rock pivoting on where the pressure lever 116 is supported by the support plate 117. One end of a second tension spring 119 is connected to the distal end part of the pressure lever 116. This second tension spring 119 is a coil spring that is stronger than the first tension spring 113. The other end of the second tension spring 119 is connected to a stationary catch 120 that is formed to the base 110 of the transportation arm 36 above the distal end part of the pressure lever 116. The distal end part of the pressure lever 116 is thus pulled upward by the second tension spring 119. A stop 121 formed to the base 110 is positioned above and near the distal end part of the pressure lever 116, and limits the rocking motion of the pressure lever 116 that is urged upward by the second tension spring 119. The belt clip 112 is located at a position with a gap S to the pressure lever 116 when the pressure lever 116 is stopped against the stop 121.

If the timing belt 104 is driven by the elevator drive motor 37 (see FIG. 5), the transportation arm 36 moves up or down in unison with the belt clip 112 that is fastened to the timing belt 104. If the media guide 133 described below or the gripping mechanism (holding mechanism) 130 contacts the media M and the downward load on the transportation arm 36 increases, the belt clip 112 alone moves down relative to the transportation arm 36 in resistance to the urging force of the first tension spring 113. In addition, if the belt clip 112 continues to move downward using the timing belt 104, the belt clip 112 will contact the pressure lever 116. After the transportation arm 36 then deflects slightly, the pressure lever 116 rocks by pivoting where it is supported by the support plate 117 in resistance to the second tension spring 119.

*Internal Mechanism of the Transportation Arm

The internal mechanism of the transportation arm is described next.

Figure 9:
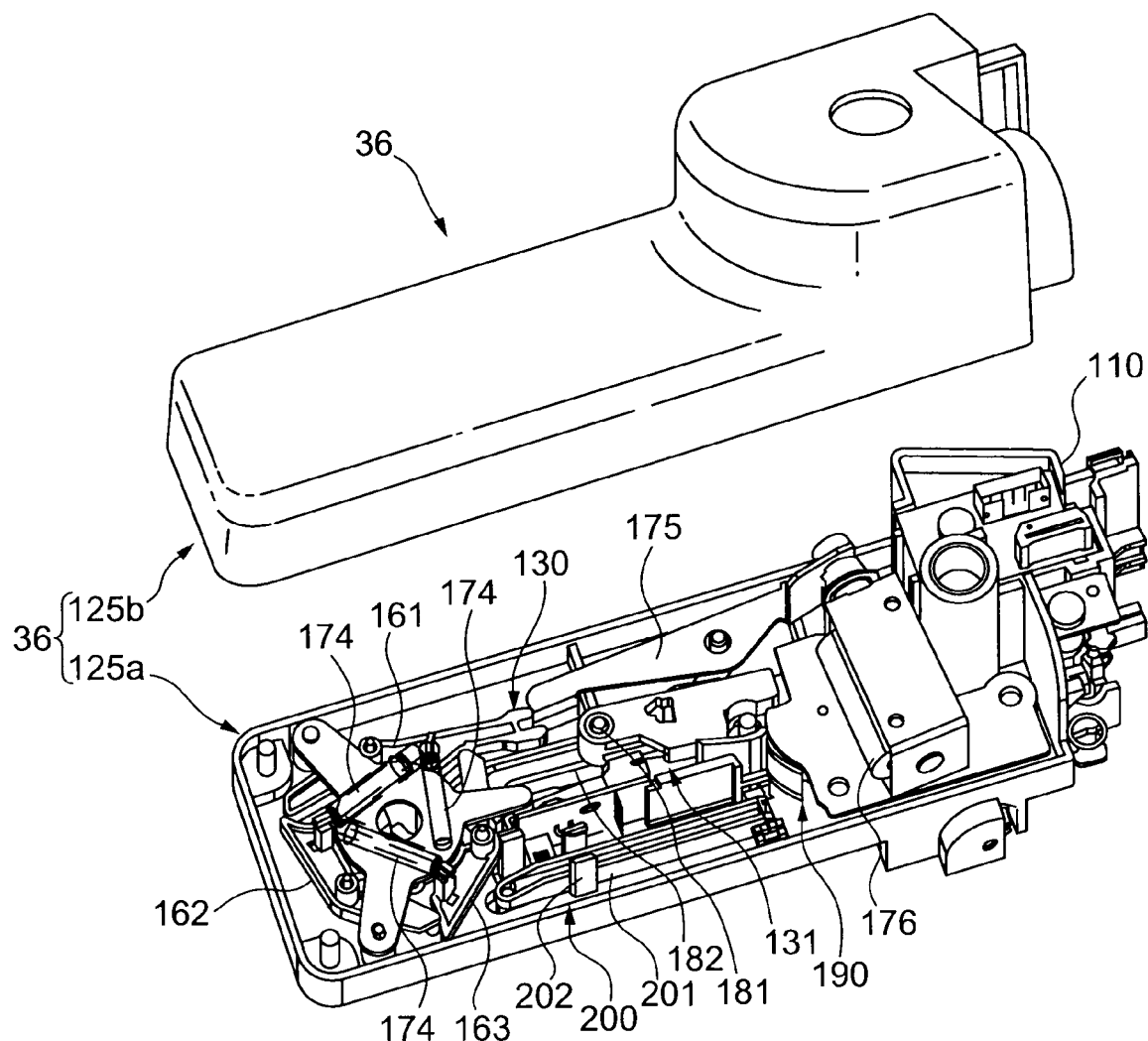
FIG. 9 is an oblique view showing the internal structure of the transportation arm.
Figure 10:
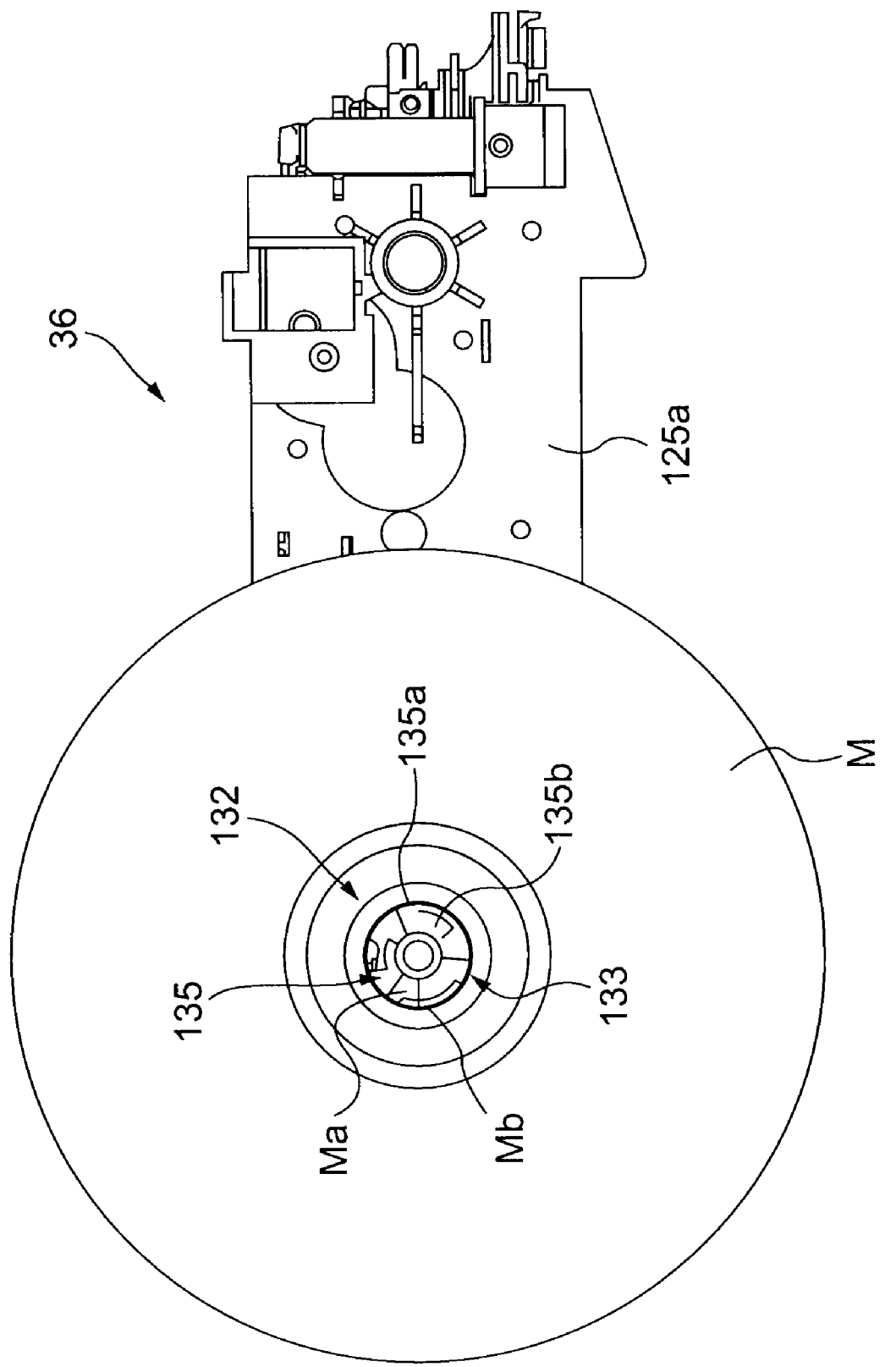
FIG. 10 is a plan view from the bottom of the transportation arm when holding a disc.
Figure 11:
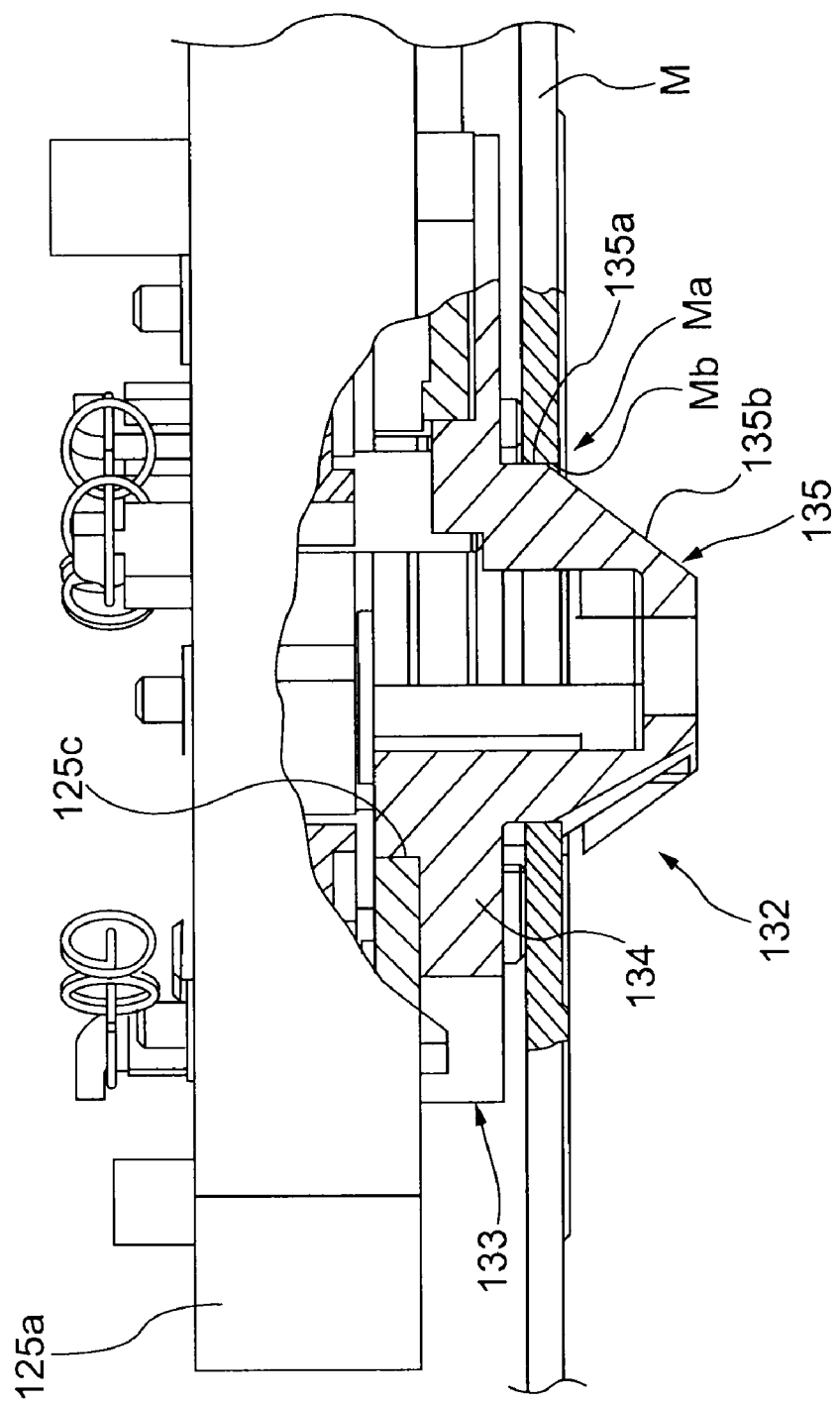
FIG. 11 is a section view of the gripping part of the transportation arm.
Figure 12:
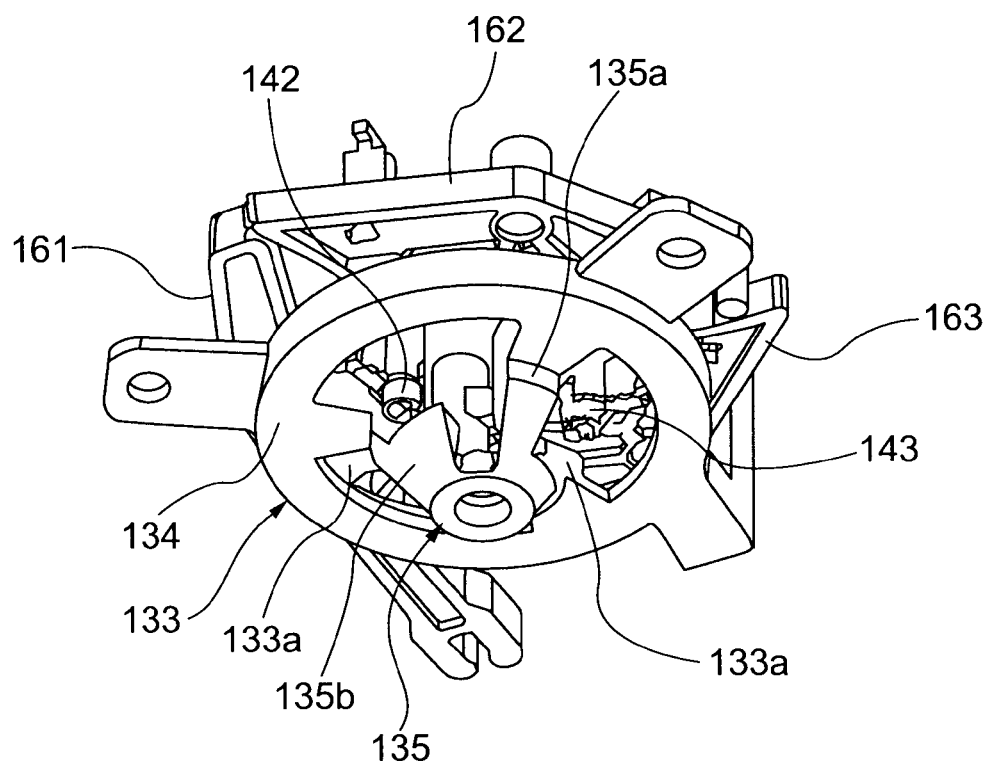
FIG. 12 is an oblique view of the media guide positioned on the gripping part of the transportation arm.
Figure 13:
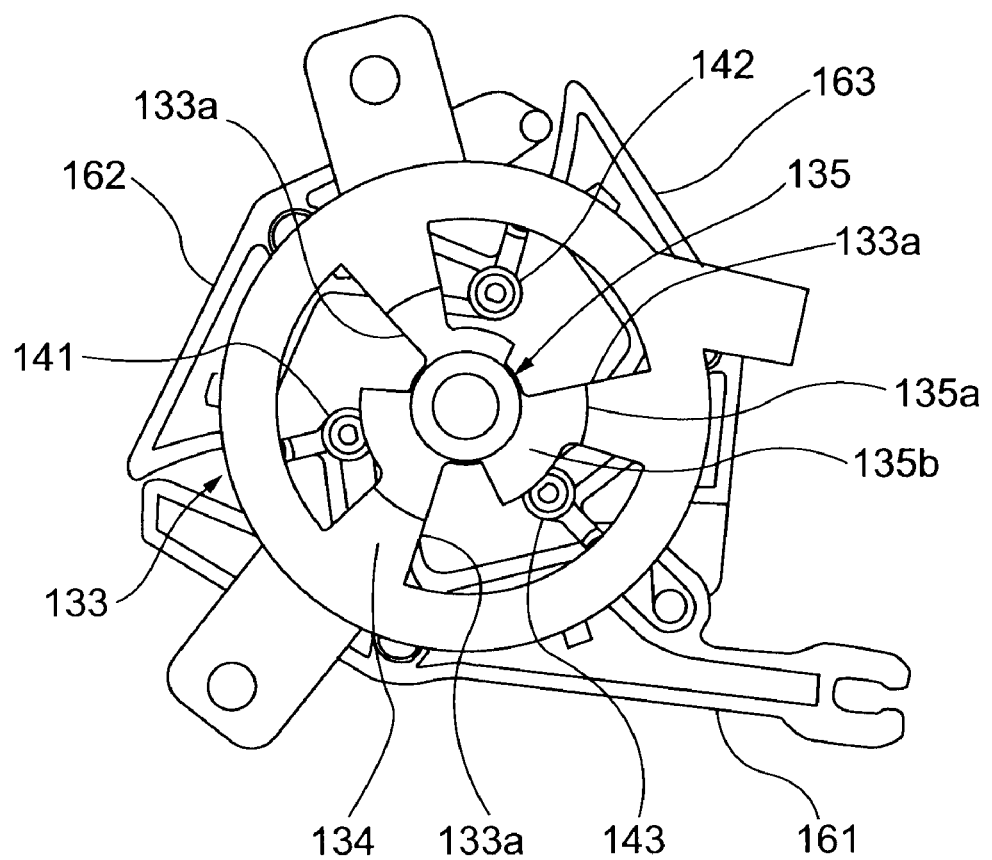
FIG. 13 is a plan view of the media guide positioned on the gripping part of the transportation arm.
Figure 14:
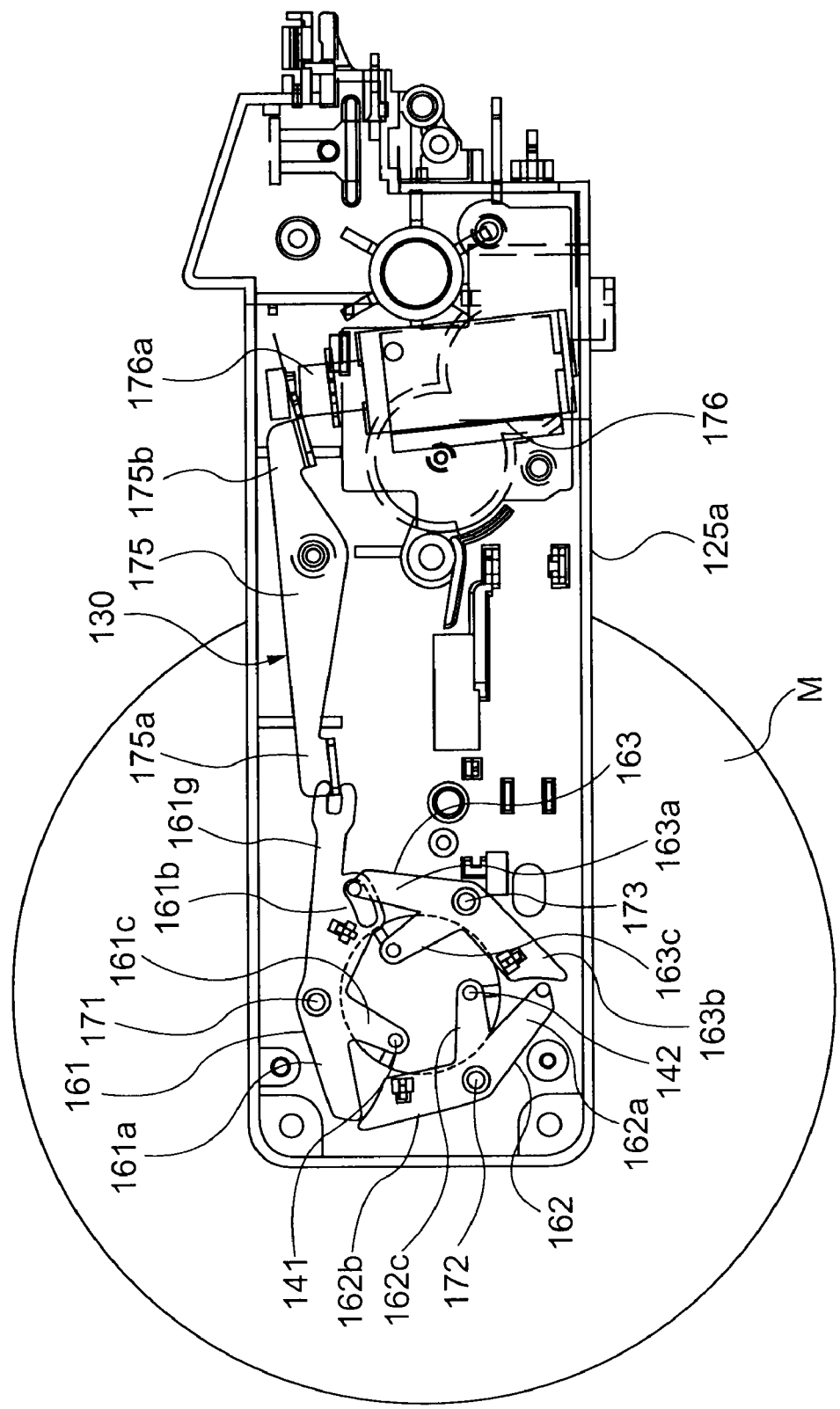
FIG. 14 is a plan view of the arm base used to describe the gripping mechanism.
Figure 15:
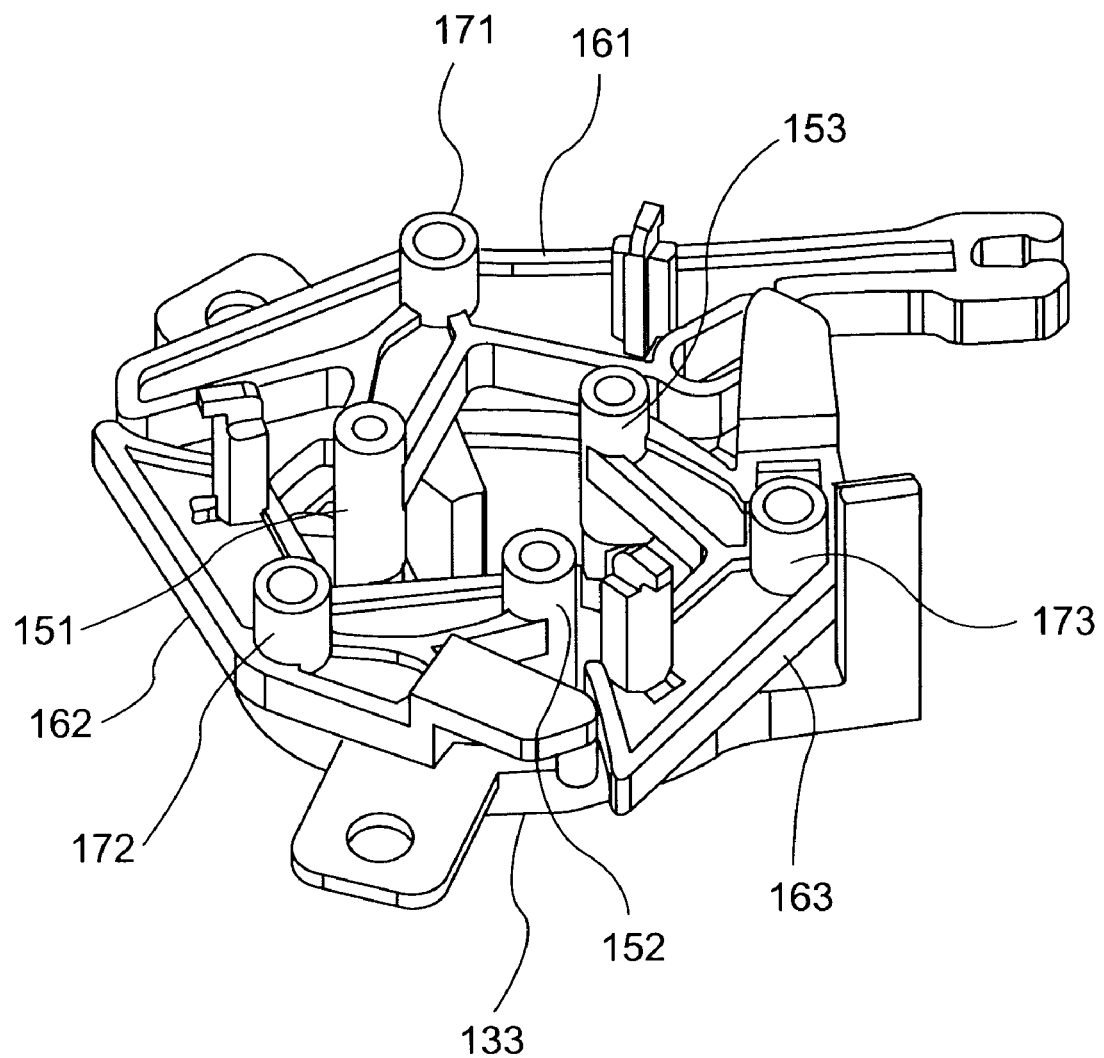
FIG. 15 is an oblique view of the fingers of the gripping mechanism.
Figure 16:
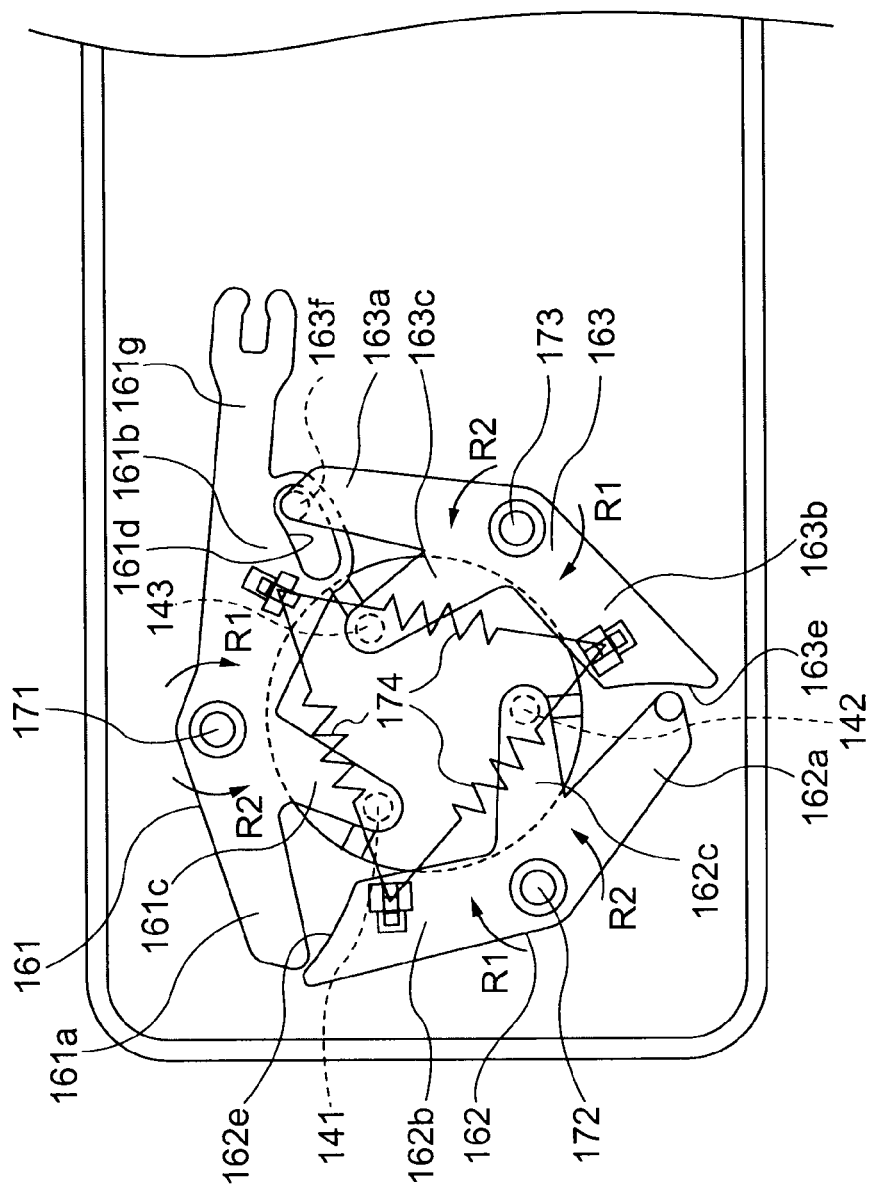
FIG. 16 is an enlarged plan view of the gripping fingers.
Figure 17:
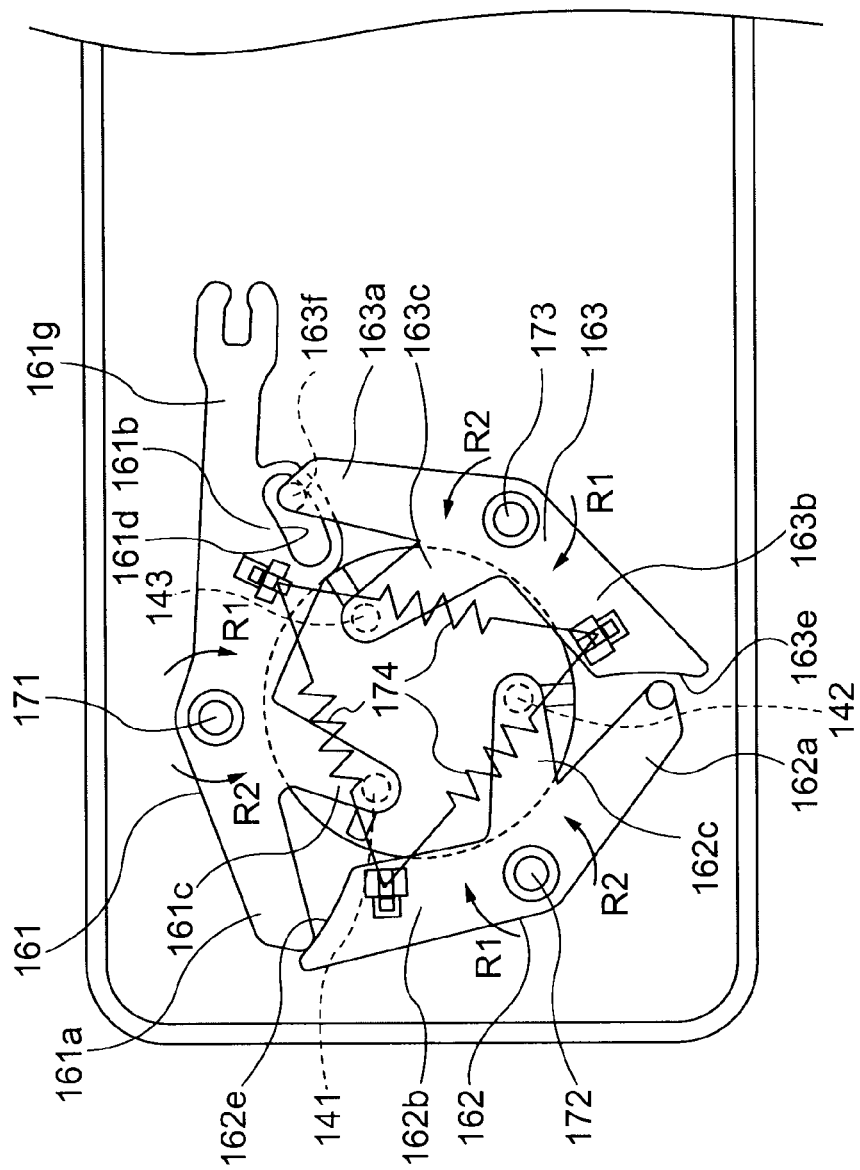
FIG. 17 is a plan view showing the operation of the spindle platter and the gripping fingers.
Figure 18:
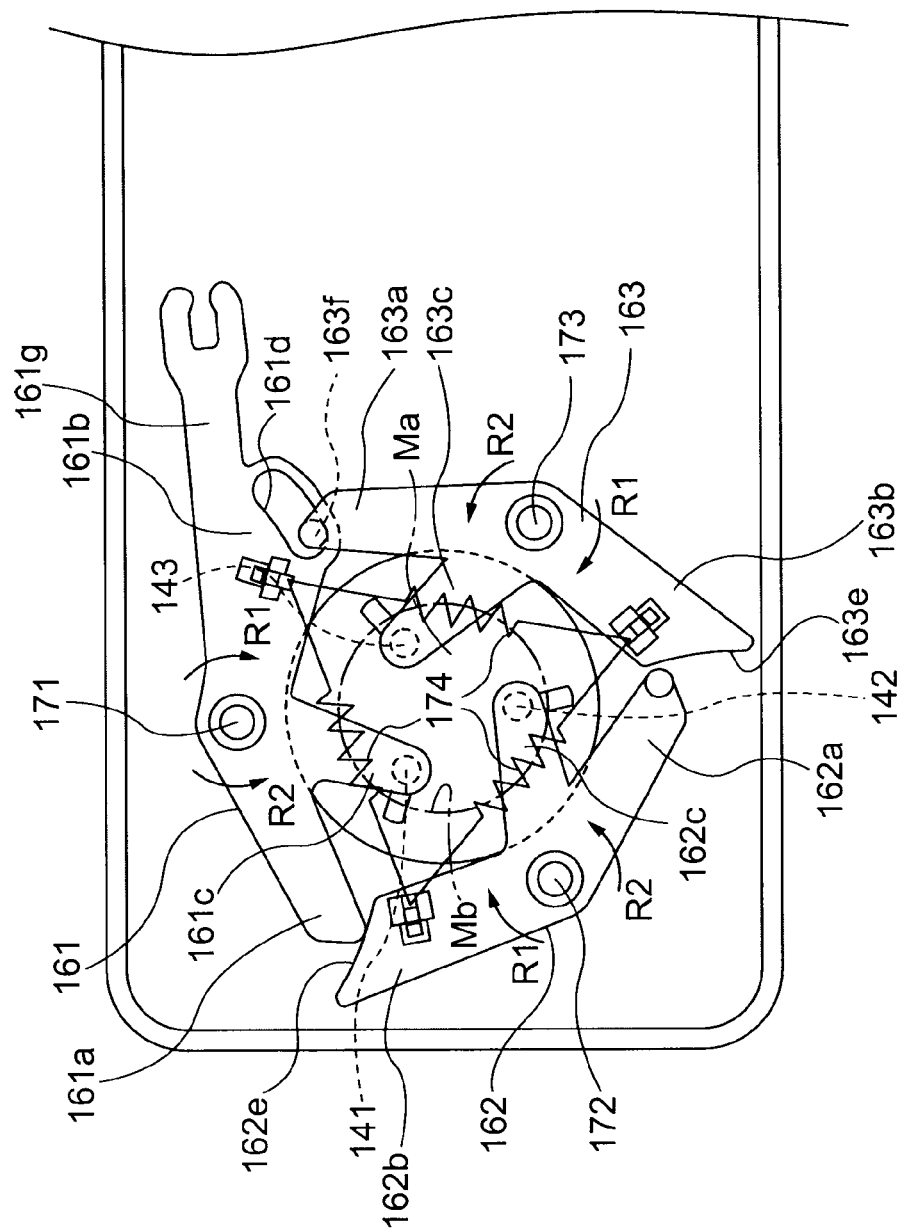
FIG. 18 is a plan view showing the operation of the spindle platter and the gripping fingers.
Figure 19:
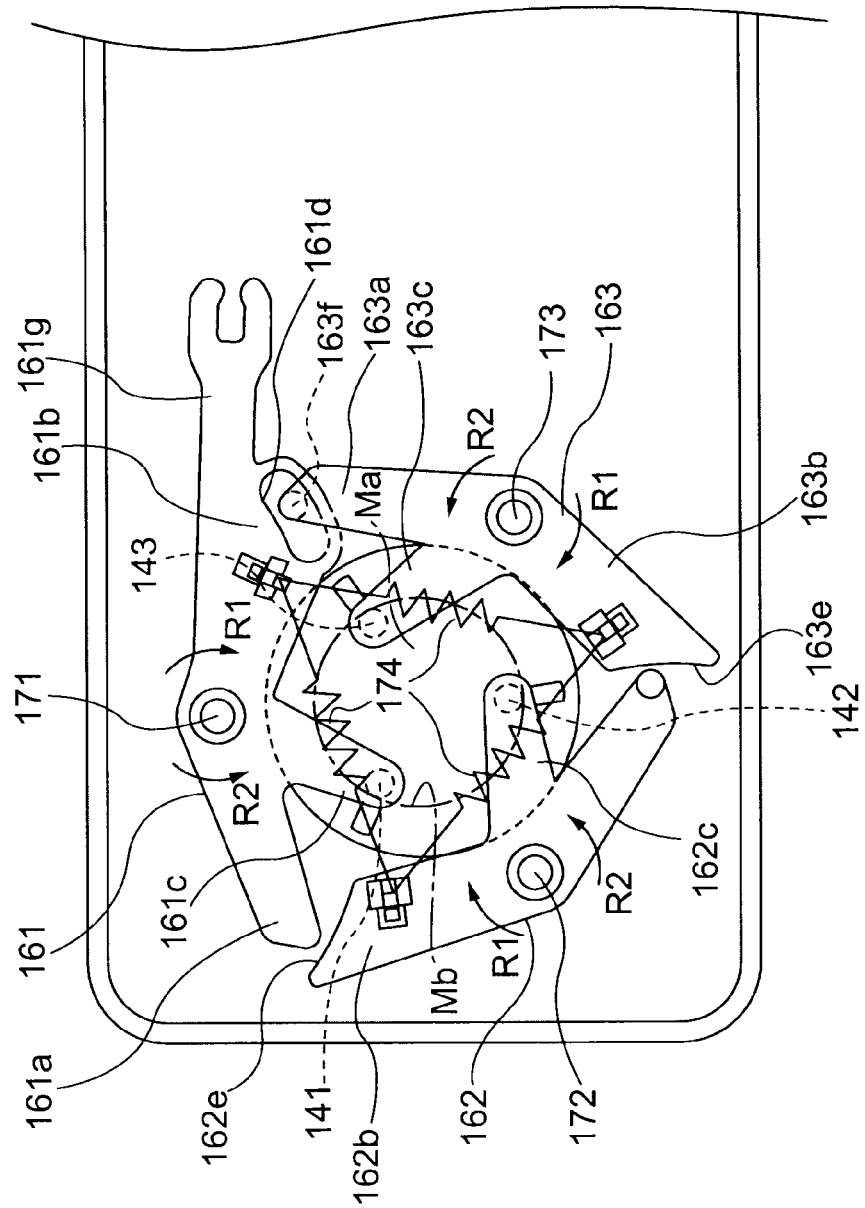
FIG. 19 is a plan view showing the operation of the spindle platter and the gripping fingers.
Figure 20:
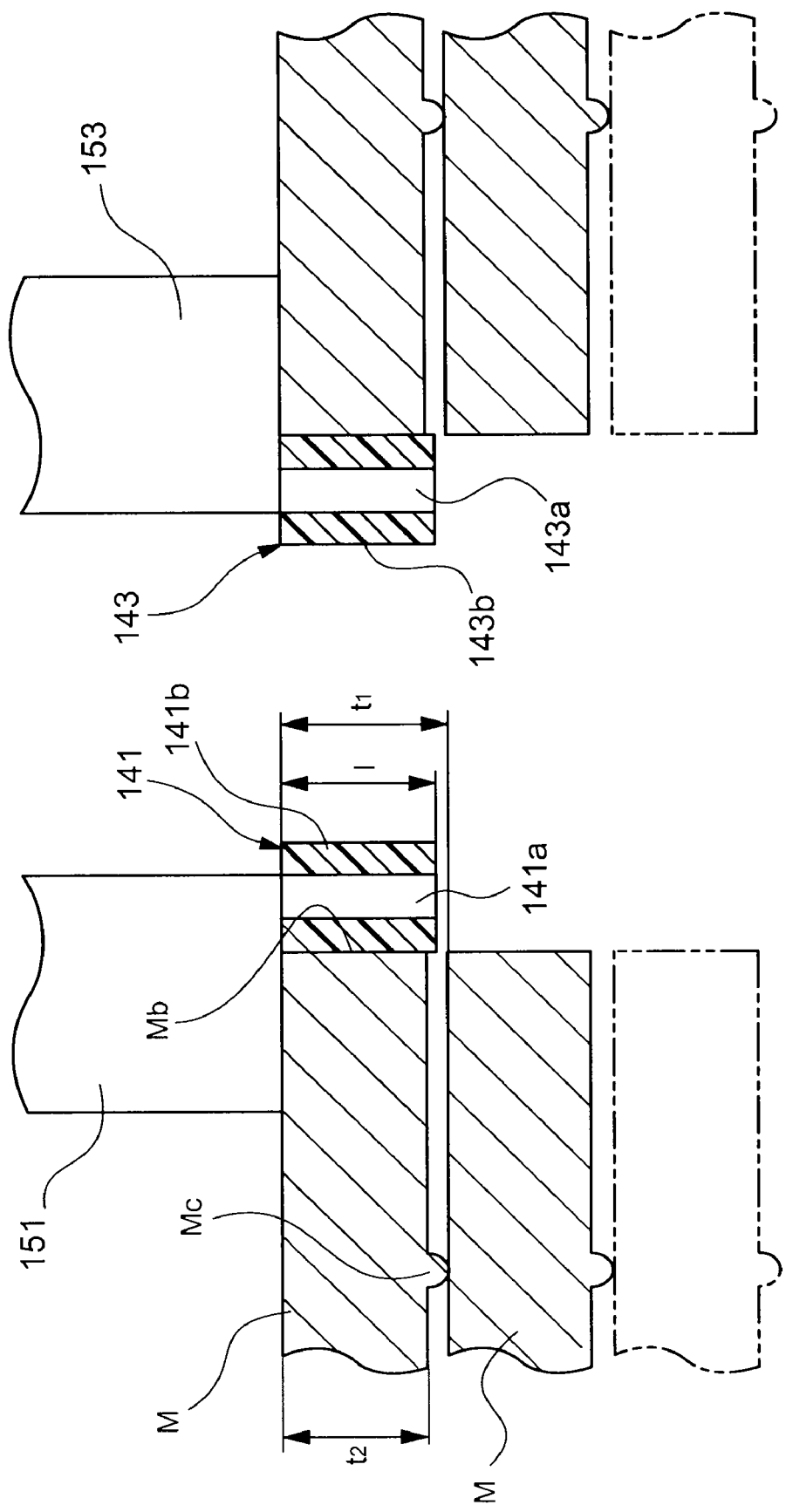
FIG. 20 is a section view of the gripping fingers used to describe the fingers in detail.
Figure 21:
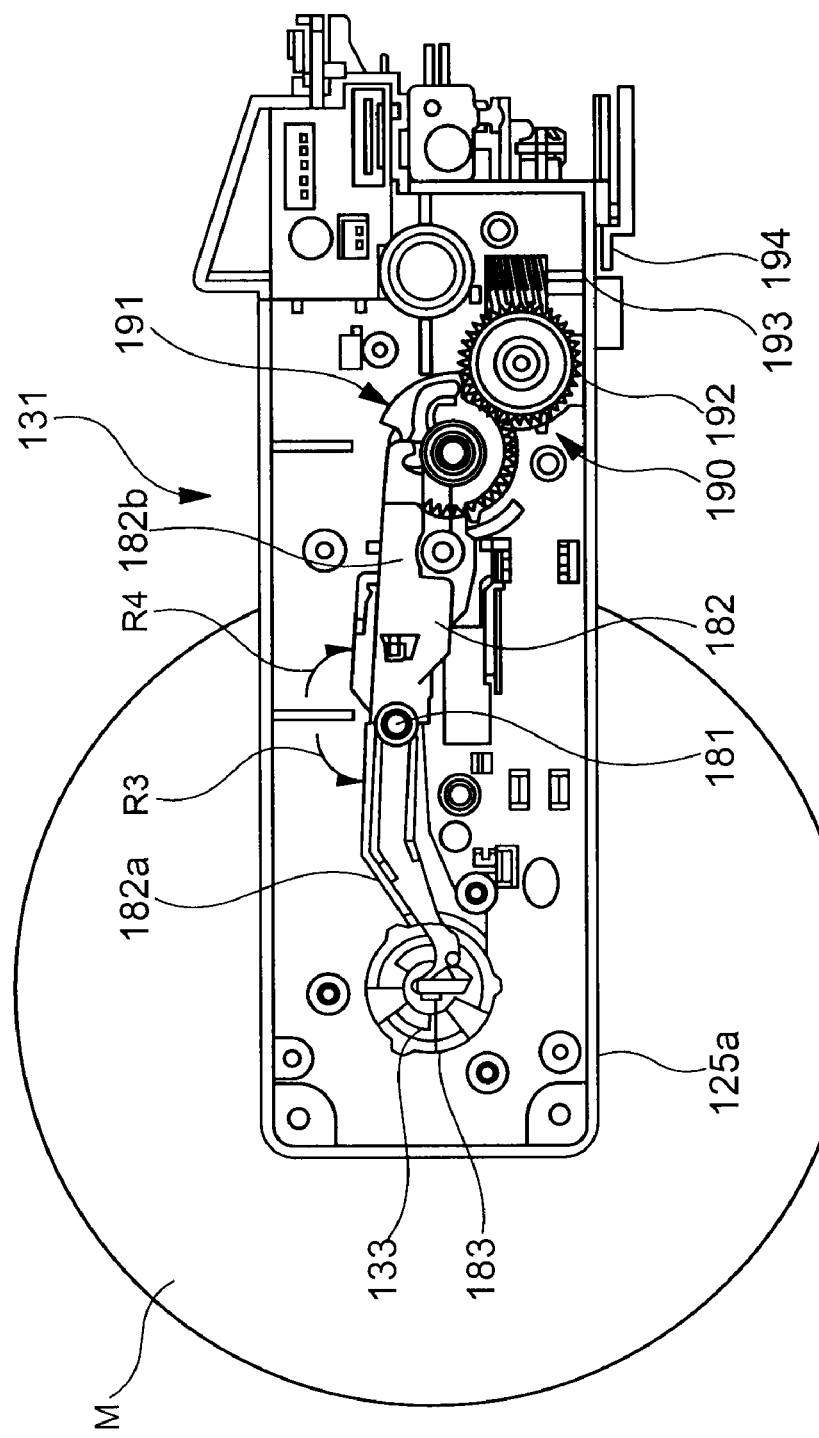
FIG. 21 is a plan view of the arm base showing the kick-down mechanism.
Figure 22:
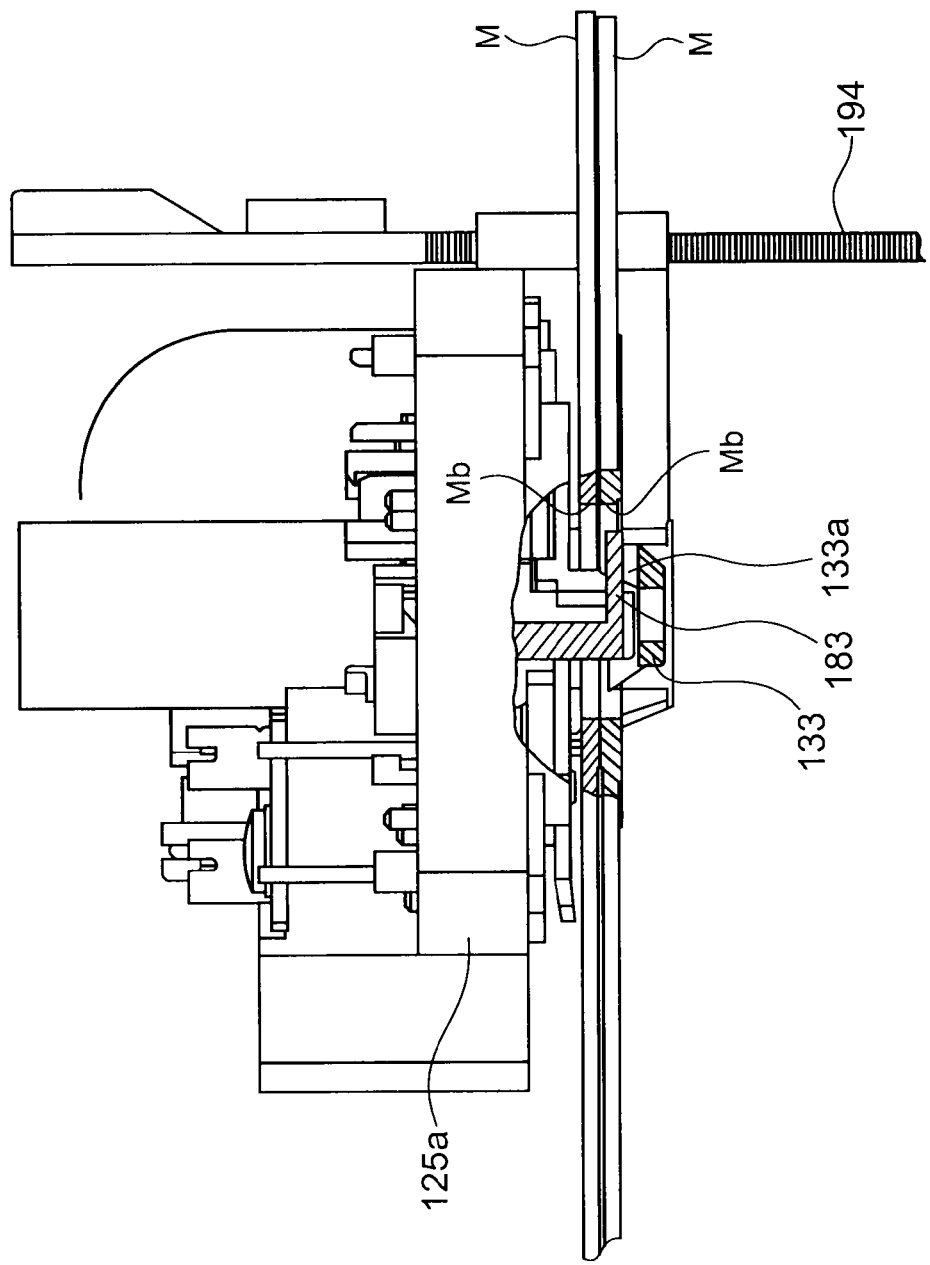
FIG. 22 is a frontal view of the transportation arm showing the gripping unit in section.
Figure 23:
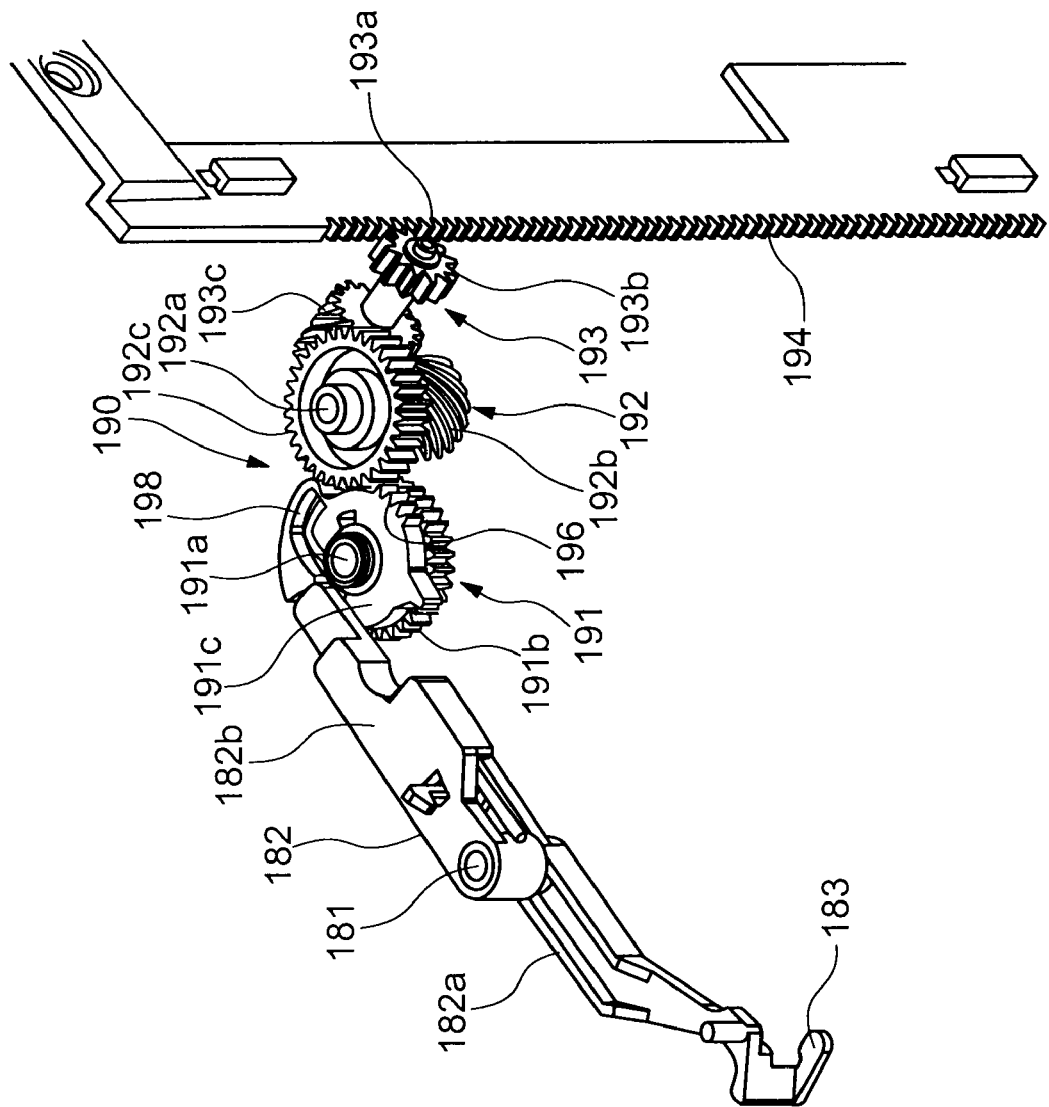
FIG. 23 is an oblique view of the kick-down mechanism.
Figure 24:
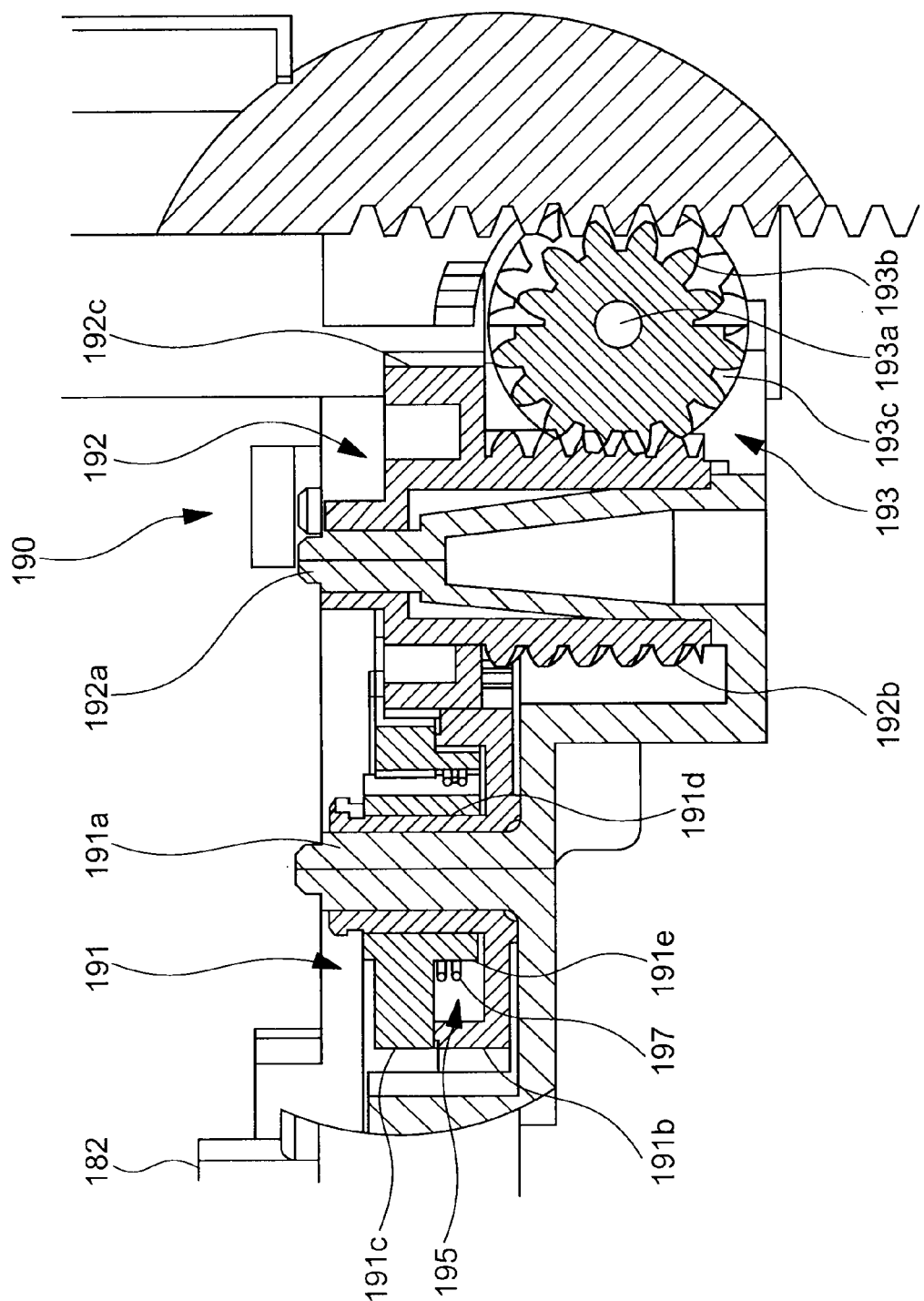
FIG. 24 is a section view of the rocking mechanism part of the kick-down mechanism.
Figure 25:
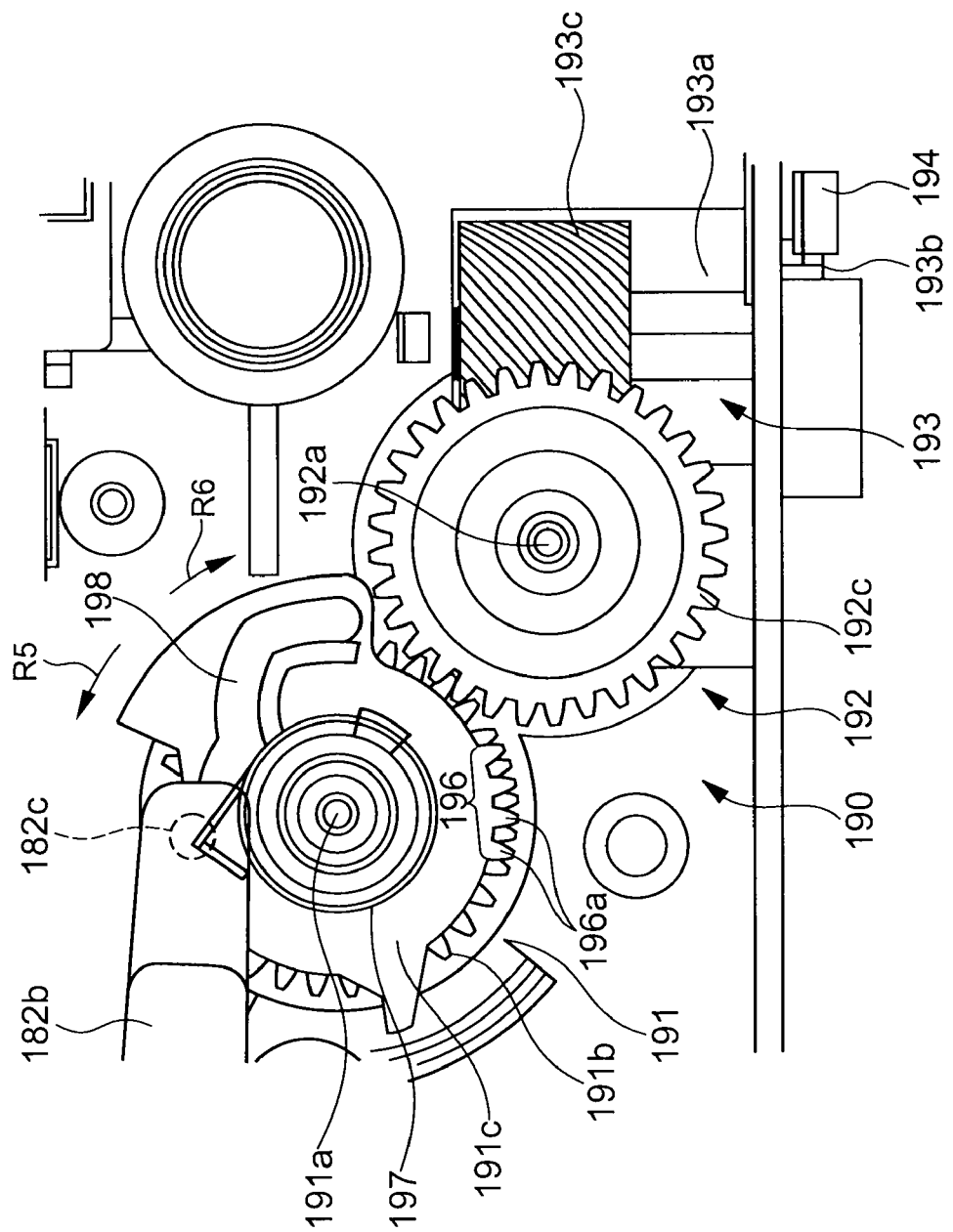
FIG. 25 is a plan view of the rocking mechanism part of the kick-down mechanism.
Figure 26:
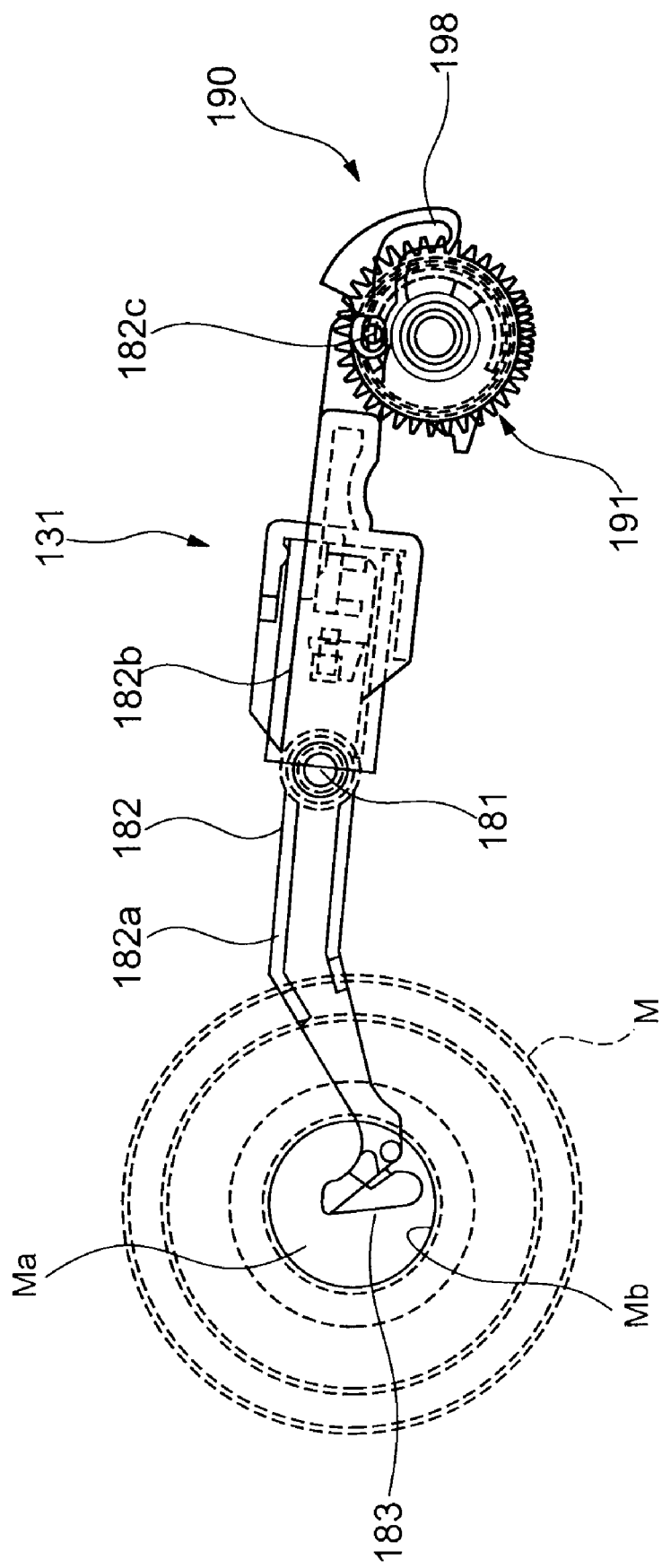
FIG. 26 is a basic plan view showing the operation of the kick-down mechanism.
Figure 27:
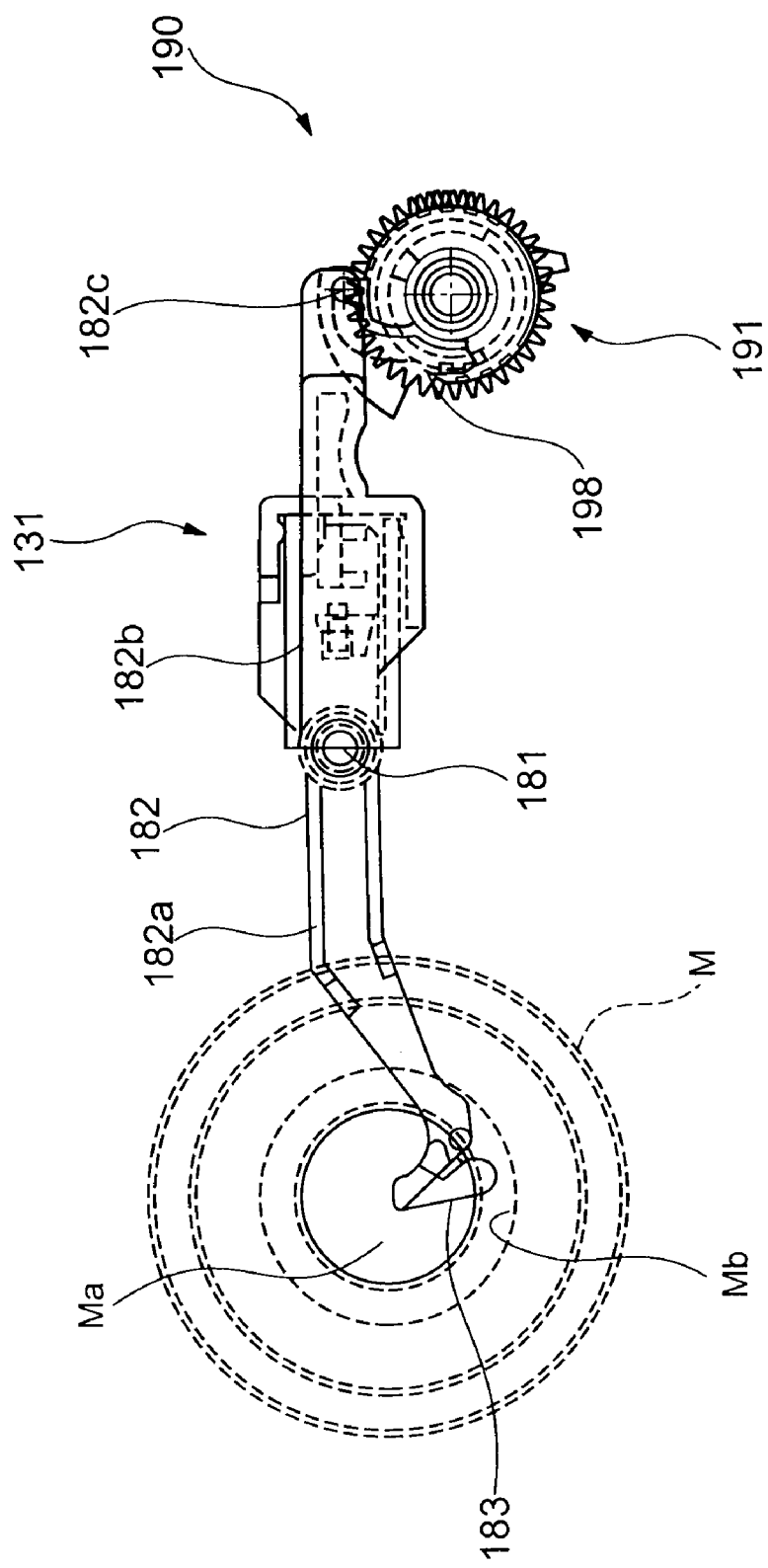
FIG. 27 is a basic plan view showing the operation of the kick-down mechanism.
Figure 28:
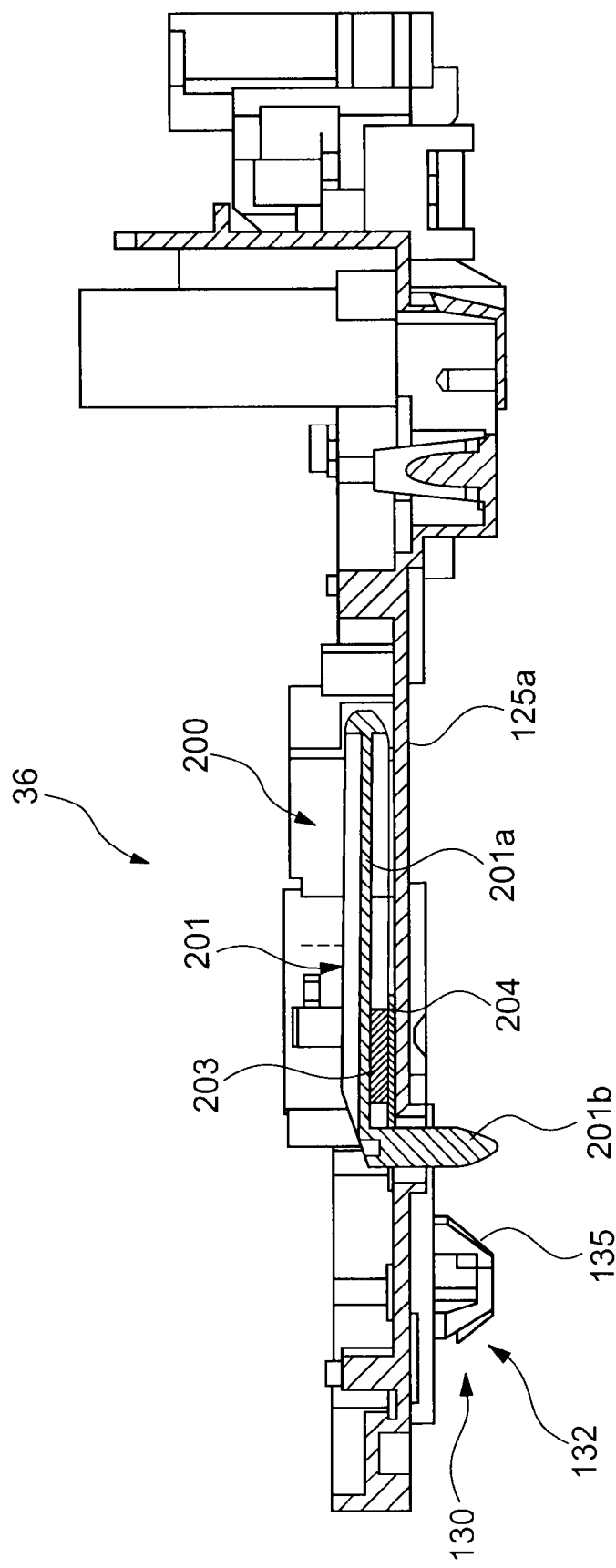
FIG. 28 is a section view showing the construction of the media detection mechanism.
Figure 29:
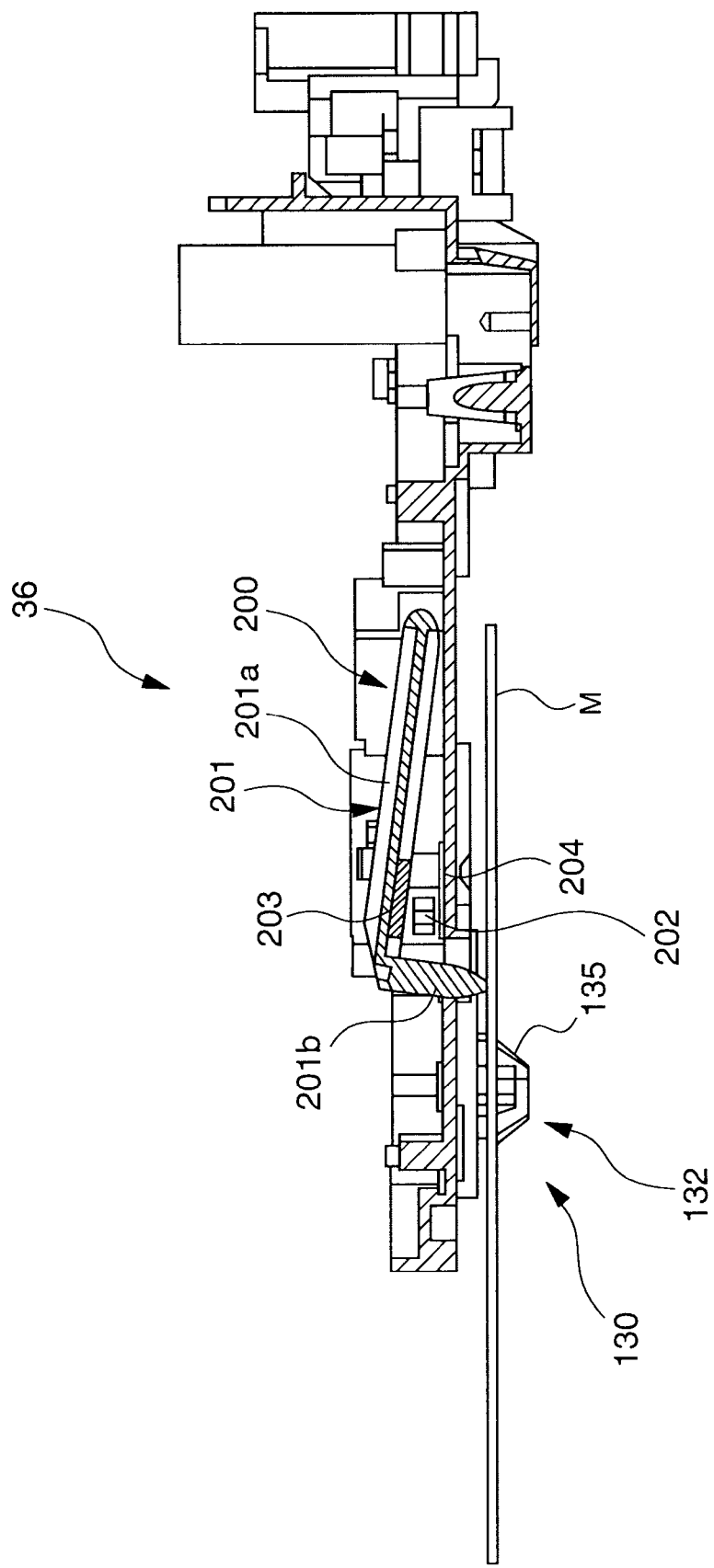
FIG. 29 is a section view showing the operation of the media detection mechanism.

FIG. 9 is an oblique view showing the internal arrangement of the transportation arm, FIG. 10 FIG. 10 is a plan view from the bottom of the transportation arm when holding a disc, FIG. 11 is a section view of the gripping part of the transportation arm, FIG. 12 is an oblique view of the media guide positioned on the gripping part of the transportation arm, FIG. 13 is a plan view of the media guide positioned on the gripping part of the transportation arm, FIG. 14 is a plan view of the arm base used to describe the gripping mechanism, FIG. 15 is an oblique view of the fingers of the gripping mechanism, FIG. 16 is an enlarged plan view of the gripping fingers, FIG. 17 to FIG. 19 are plan views showing the operation of the spindle platter and the gripping fingers, FIG. 20 is a section view of the gripping fingers used to describe the fingers in detail, FIG. 21 is a plan view of the arm base showing the kick-down mechanism, FIG. 22 is a frontal view of the transportation arm showing the gripping unit in section, FIG. 23 is an oblique view of the kick-down mechanism, FIG. 24 is a section view of the rocking mechanism part of the kick-down mechanism, FIG. 25 is a plan view of the rocking mechanism part of the kick-down mechanism, FIG. 26 and FIG. 27 are basic plan views showing the operation of the kick-down mechanism, FIG. 28 is a section view showing the construction of the media detection mechanism, and FIG. 29 is a section view showing the operation of the media detection mechanism.

As shown in FIG. 9, the transportation arm 36 has a long, slender arm base 125a that is substantially rectangular in plan view, and an arm case 125b that has the same outside contour as and covers the top of the arm base 125a. The gripping mechanism 130 for holding the media M, a kick-down mechanism 131, and a media detection mechanism 200 are assembled in the arm base 125a, and the gripping mechanism 130, the kick-down mechanism 131, and the media detection mechanism 200 are covered and hidden by the arm case 125b.

As shown in FIG. 10 and FIG. 11, a gripping unit 132 that grips the media M is positioned at the underside part near the distal end of the arm base 125a, and the media guide 133 is positioned on the gripping unit 132.

As shown in FIG. 12 and FIG. 13, the media guide 133 has a guide unit 135 that projects down from the center of a fixed plate 134, which is affixed to the bottom of the arm base 125a, and is aligned with the center of the pickup hole in the media M.

The guide unit 135 has a cylindrical base end part 135a and a guide surface 135b. The base end part 135a is formed with a diameter slightly smaller than the center hole Ma of the media M. The guide surface 135b is conically shaped that slopes gradually downward while decreasing in diameter from the base end part 135a.

When the media guide 133 approaches the media M and is inserted to the center hole Ma of the media M, the inside surface Mb of the center hole Ma in the media M contacts the guide surface 135b. The center of the media M is thus aligned with the center of the media guide 133 by the guide surface 135b, the center hole Ma of the media M is guided to the base end part 135a, and the base end part 135a is inserted to the center hole Ma of the media M.

The media guide 133 has three apertures 133a arranged so that the three gripping fingers 141 to 143 of the gripping mechanism 130 and the ejector 183 of the kick lever 182 of the kick-down mechanism 131 can pass through the apertures 133a.

As shown in FIG. 12 and FIG. 13, the gripping mechanism 130 has three tubular fingers 141 to 143 arranged in a circle at an equiangular interval (120°). The fingers 141 to 143 descend vertically from a round hole 125c formed in the distal end of the arm base 125a and are positioned inside the apertures 133a in the media guide 133. These three fingers 141 to 143 are inserted to the center hole Ma of the media M guided onto the base end part 135a by the media guide 133, spread to the outside in the radial direction while protruding from the apertures 133a in the media guide 133, and thus contact the inside surface Mb of the center hole Ma in the media M and grip the media M.

The fingers 141 to 143 are attached to the bottom end of support pins 151 to 153 having a slightly larger diameter. These support pins 151 to 153 pass through to the top of the round hole 125c in the arm base 125a, and are affixed to three pivot arms 161 to 163 positioned above the arm base 125a. Pivot pins 171 to 173 are affixed to the arm base 125a at an equiangular interval concentrically around the round hole 125c, and the pivot arms 161 to 163 are supported pivotably on these pivot pins 171 to 173.

As shown in FIG. 14 to FIG. 16, the pivot arms 161 to 163 each have a forward arm part 161a to 163a that extends toward the front of the arm base 125a substantially circumferentially to the round hole 125c (counterclockwise when seen from above), a back arm part 161b to 163b that extends toward the back substantially circumferentially to the round hole 125c (clockwise when seen from above), and a support arm 161c to 163c that extends from the pivot point of the pivot arm 161 to 163 to the inside of the round hole 125c. The support pins 151 to 153 are fixed vertically to the back side of the distal end part of the 1613c.

An oblong hole 161d is formed substantially radially to the round hole 125c in the back arm part 161b of the pivot arm 161. A slide pin 163f descending from the back end of the forward arm part 163a of the pivot arm 163 is inserted slidably to the oblong hole 161d.

A slide face 163e is formed substantially in line with the radius of the round hole 125c to the distal end of the back arm part 163b of pivot arm 163. The front end part of the forward arm part 162a of pivot arm 162 can slide against this slide face 163e.

A slide face 162e is formed substantially in line with the radius of the round hole 125c to the distal end of the back arm part 162b of pivot arm 162. The front end part of the forward arm part 161a of pivot arm 161 can slide against this slide face 162e.

The oblong hole 161d in the pivot arm 161 and the slide faces 162e, 163e of the pivot arms 162, 163 are formed with a concave curve that is set so that the pivot arms 161 to 163 all pivot in the same direction.

Coil tension springs (urging member) 174 connect the back arm part 161b of the pivot arm 161 and the back arm part 162b of the pivot arm 162, the back arm part 162b of the pivot arm 162 and the back arm part 163b of the pivot arm 163, and the back arm part 163b of the pivot arm 163 and the back arm part 161b of the pivot arm 161. The tension of the coil springs 174 holds the pivot arms 161 to 163 so that there is no play therebetween, and applies an urging force to the pivot arms 161 to 163 in the direction of arrow R1 in FIG. 16 (that is, in the direction causing the fingers 141 to 143 to separate and open).

When positioned as shown in FIG. 16, the diameter of the circumscribed circle of the fingers 141 to 143 attached to the distal ends of the support arm 161c to 163c of the pivot arms 161 to 163 is greater than the inside diameter of the center hole Ma of the media M. When one pivot arm 161 rotates in the direction of arrow R2 from this position, the other two pivot arms 162 and 163 also turn in the same direction. This causes the support arms 161c to 163c of the pivot arms 161 to 163 to move toward the center of the round hole 125c, and the fingers 141 to 143 attached to the distal ends of the support arms 161c to 163c to close together so that the fingers 141 to 143 can be inserted to the center hole Ma of the media M.

When the fingers 141 to 143 are then inserted to the center hole Ma of the media M and the pivot arms 161 to 163 then pivot in the opposite direction R1, the fingers 141 to 143 open apart and are pushed to the outside in the radial direction. This causes the fingers 141 to 143 to push against the inside surface Mb of the center hole Ma of the media M and thereby grip the media M.

As shown in FIG. 14, the pivot arm 161 also has an operating arm 161g that extends away from the support arm 161c. The distal end of one arm part 175a of the link 175 is fit to pivot freely in the distal end part of the operating arm 161g. The link 175 is supported so that it can pivot freely at the middle on the arm base 125a. The distal end part of the other arm part 175b is connected to the operating rod 176a of a solenoid 176. The force of an internal spring pushes the operating rod 176a out to the extended position when the solenoid 176 is off.

When the solenoid 176 turns on, the operating rod 176a is retracted against the force of the internal spring, causing the link 175 to pivot and the pivot arm 161 to rock in the direction of arrow R2. As shown in FIG. 17, this also causes the slide face 162e of the back arm part 162b of the pivot arm 162 to slide against the distal end of the forward arm part 161a of the pivot arm 161, and the inside surface of the oblong hole 161d in the back arm part 161b of pivot arm 161 to slide against the slide pin 163f of the forward arm part 163a of pivot arm 163. As a result, the slide face 162e of pivot arm 162 slides against the distal end of the forward arm part 161a of pivot arm 161 and slides to the outside radially to the round hole 125c, causing the pivot arm 162 to pivot in the direction of arrow R2. The inside of the oblong hole 161d in back arm part 161b of pivot arm 161 also slides against the slide pin 163f of the forward arm part 163a of pivot arm 163 so that the forward arm part 163a of pivot arm 163 slides toward the center of the round hole 125c and the pivot arm 163 also pivots in the direction of arrow R2.

When the pivot arm 161 turns in the direction of arrow R2, the torque of the pivot arm 161 in the direction of arrow R2 is thus transferred to the other pivot arms 162 and 163. As shown in FIG. 18, the pivot arms 162 and 163 thus also pivot in the direction of arrow R2, the fingers 141 to 143 positioned on the support arms 161c to 163c of the pivot arms 161 to 163 are positioned inside a circumscribed circle that is smaller in diameter than the center hole Ma of the media M, and are thus closed together so that they can be inserted to the center hole Ma of the media M.

When the solenoid 176 then turns off, the force of the internal spring causes the operating rod 176a to extend and the link 175 to pivot. This circular motion of the link 175 is transferred to the pivot arm 161, and the pivot arm 161 turns in the direction of arrow R1. The force of the coil springs 174 causes the other two pivot arms 162 and 163 to move in conjunction with the pivot arm 161, thereby pulling the respective pivot arms 162b and 163b to move toward the center of the round hole 125c and causing the pivot arms 162 and 163 to also pivot like pivot arm 161 in the direction of arrow R1. As a result, as shown in FIG. 19, the fingers 141 to 143 are pushed apart so that the fingers 141 to 143 are pushed against the inside surface Mb of the center hole Ma of the media M, and the media M is thereby gripped.

Because the pivot arms 162 and 163 are pivoted independently of the pivot arm 161 in the direction of arrow R1 by the force of the coil springs 174, the fingers 141 to 143 also move independently radially to the outside and are pushed against the inside surface Mb of the center hole Ma of the media M.

As shown in FIG. 20, the three fingers 141 to 143 each have a cylindrical pin 141a to 143a protruding from the bottom end of the corresponding support pin 151 to 153, and an elastic tube 141b to 143b made of rubber, for example, concentrically surrounding the pin 141a to 143a. The downward protruding length l of the three fingers 141 to 143 is less than or equal to the thickness t1 of the media M that the fingers 141 to 143 hold. This protruding length l is preferably greater than or equal to the thickness t2 of the inside surface Mb of the center hole Ma of the media M, and less than or equal to the thickness t1 of the media M including the height of an annular land Mc. This arrangement enables gripping the one top disc M of the stack without the fingers 141 to 143 touching the inside surface Mb of the second disc M when picking a disc M from a substantially concentric stack of plural discs.

As shown in FIG. 21 to FIG. 23, the kick-down mechanism 131 positioned on the arm base 125a of the transportation arm 36 has a kick lever 182 of which the middle is supported pivotably at a connection point 181 on the arm base 125a. The kick lever 182 has a distal end lever part 182a joined at the connection point 181 to a base end lever part 182b. An operating ejector 183 that curves down at the end and then further bends to the side in an L-shape is positioned on the distal end of the distal end lever part 182a, and this ejector 183 is positioned inside the media guide 133 of the gripping unit 132.

When the fingers 141 to 143 of the gripping unit 132 grip a disc M, the ejector 183 of the kick lever 182 is positioned horizontally below the disc M. More specifically, the ejector 183 is set to the position of the second disc M in the coaxial stack of multiple media M.

When this kick lever 182 then swings at the connection point 181 in the direction of arrow R3 in FIG. 21, the ejector 183 projects to the side from the aperture 133a in the media guide 133 and contacts the inside surface Mb of the center hole Ma of the second disc M located below the topmost disc M that is held by the fingers 141 to 143. The kick lever 182 then pivots in the opposite direction in the direction of arrow R4, and the ejector 183 is pulled inside the media guide 133.

A rocking mechanism 190 is positioned on the base end lever part 182b of the kick lever 182. This rocking mechanism 190 has a compound clutch gear 191, a vertical compound transfer gear 192, a horizontal compound transfer gear 193, and a rack 194.

As shown in FIG. 5, the rack 194 is supported vertically parallel to the vertical guide shaft 35 on the chassis 32 of the media transportation mechanism 31. The horizontal compound transfer gear 193 is supported on the arm base 125a rotatably on a horizontal shaft 193a, and has a pinion 193b that meshes with the rack 194. When the transportation arm 36 ascends and descends, the pinion 193b meshed with the rack 194 causes the horizontal compound transfer gear 193 to turn.

The horizontal compound transfer gear 193 has a helical gear 193c, and this helical gear 193c meshes with the helical gear 192b of the vertical compound transfer gear 192, which is supported on the arm base 125a rotatably on a vertical shaft 192a. As a result, when the horizontal compound transfer gear 193 turns, the meshed helical gears 192b and 193c transfer the rotation of the horizontal compound transfer gear 193 mounted on a horizontal shaft 193a to the vertical compound transfer gear 192 mounted on a vertical shaft 192a, and the vertical compound transfer gear 192 thus turns.

The vertical compound transfer gear 192 also has a spur gear 192c. The spur gear 192c engages a spur gear 191b positioned on the compound clutch gear 191, which is supported on the arm base 125a rotatably on a vertical shaft 191a. As a result, when the vertical compound transfer gear 192 turns, the meshed spur gears 191b and 192c transfer the rotation of the vertical compound transfer gear 192 to the compound clutch gear 191, and the compound clutch gear 191 thus turns.

As shown in FIG. 24 and FIG. 25 the compound clutch gear 191 has an intermittent gear 191c that can rotate relative to the spur gear 191b. A clutch mechanism 195 is positioned between the spur gear 191b and the intermittent gear 191c. The spur gear 191b has a cylindrical shaft 191d in which the vertical shaft 191a is inserted, and this cylindrical shaft 191d is inserted to a cylindrical shaft 191e formed in the intermittent gear 191c.

As shown in FIG. 25, a rack 196 with a plurality of teeth 196a is formed on a part of the outside edge of the intermittent gear 191c, and this rack 196 can mesh with the spur gear 192c of the vertical compound transfer gear 192.

The clutch mechanism 195 positioned on the compound clutch gear 191 has a torsion spring 197 that is wound around the outside of the cylindrical shaft 191e of the intermittent gear 191c. When the spur gear 192c of the vertical compound transfer gear 192 causes the spur gear 191b to rotate in the direction of arrow R5, that is, counterclockwise when seen from above as shown in FIG. 25, the friction produced by the torsion spring 197 causes the intermittent gear 191c to rotate with the spur gear 191b. As a result, the rack 196 of the intermittent gear 191c engages the spur gear 192c of the vertical compound transfer gear 192, and the spur gear 191b also turns in the direction of arrow R5. Conversely, when the spur gear 192c of the vertical compound transfer gear 192 causes the spur gear 191b to turn clockwise as seen from above in the direction of arrow R6 as shown in FIG. 25, the friction produced by the torsion spring 197 causes the intermittent gear 191c to turn with the spur gear 191b. The rack 196 of the intermittent gear 191c therefore engages the spur gear 192c of the vertical compound transfer gear 192, and the intermittent gear 191c is turned in the direction of arrow R6 with the spur gear 191b.

A cam channel 198 is formed in the intermittent gear 191c. A cam pin 182c that projects down near the back end of the base end lever part 182b of the kick lever 182 is slidably positioned in this cam channel 198. The cam channel 198 follows a generally clockwise path from the center toward the outside circumference when seen from above in plan view. As a result, when the intermittent gear 191c rotates counterclockwise in the direction of arrow R5 when seen from above in the position shown in FIG. 26, the cam pin 182c in the cam channel 198 is displaced to the outside end of the slot, thus causing the kick lever 182 to pivot at the connection point 181 in the direction of arrow R3 as shown in FIG. 27 so that the ejector 183 projects toward the outside of the media guide 133. When the intermittent gear 191c then rotates clockwise in the direction of arrow R6 when seen from above, the cam pin 182c is displaced to the inside circumference end of the cam channel 198. As a result, the kick lever 182 pivots on the connection point 181 in the direction of arrow R4 and the ejector 183 is pushed to the inside of the media guide 133 as shown in FIG. 26.

With the kick-down mechanism 131 thus comprised, the compound clutch gear 191 starts to turn in the direction of arrow R5 when the transportation arm 36 begins to rise. While the transportation arm 36 continues to rise and the compound clutch gear 191 rotates a prescribed amount (approximately 45°) from the position shown in FIG. 26 to the position shown in FIG. 27, the kick lever 182 swings in the direction of arrow R3 (see FIG. 22), and the ejector 183 of the kick lever 182 kicks the second disc M down.

When the transportation arm 36 descends, the compound clutch gear 191 turns in the direction of arrow R6, the kick lever 182 therefore swings in the direction of arrow R4 (see FIG. 21), and the ejector 183 is pulled inside the media guide 133 as shown in FIG. 26. If the transportation arm 36 descends further from this position, the rack 196 separates from the spur gear 192c after the intermittent gear 191c of the compound clutch gear 191 is turned a prescribed amount (approximately 45°) in the direction of arrow R6 by the spur gear 192c of the vertical compound transfer gear 192, and the intermittent gear 191c therefore rotates freely relative to the spur gear 191b.

As shown in FIG. 28, the media detection mechanism (detection mechanism) 200 has a detection lever 201 and a detector 202 (see FIG. 9). The detection lever 201 has an arm 201a supported so that the base end can pivot on a horizontal line, and a contact unit 201b rendered by bending the distal end of the arm 201a down to form a detection probe that protrudes toward the bottom of the arm base 125a. When the transportation arm 36 descends and the contact unit 201b on the distal end of the detection lever 201 contacts the top of the media M, the detection lever 201 of this media detection mechanism 200 pivots up and is displaced from the media-not-detected position touching the arm base 125a to the media-detected position separated from the arm base 125a. When the detection lever 201 moves out of the detection area of the detector 202, the detector 202 turns on. That the gripping mechanism 130 has approached a disc M, or more specifically that a disc M is held by the gripping mechanism 130, can be detected from this detection signal from the detector 202.

The media detection mechanism 200 also has a magnet (attraction unit) 203 positioned on the arm 201a of the detection lever 201. This magnet 203 is a plastic magnet having a magnetic body mixed with a synthetic resin, and is affixed to the arm 201a of the detection lever 201. A steel plate (attraction unit) 204 that is attracted by the magnet 203 is positioned on the top of the arm base 125a at a position opposite the magnet 203 positioned on the arm 201a of the detection lever 201.

When the detection lever 201 of this media detection mechanism 200 contacts the arm base 125a and the contact unit 201b of the detection lever 201 is protruding below the bottom of the arm base 125a in the media-not-detected position, the magnetic force of the magnet 203 pulls the magnet 203 and the steel plate 204 together. As a result, when the detection lever 201 is in the media-not-detected position with the contact unit 201b protruding below the bottom of the arm base 125a, the force of attraction between the mutually attracted magnet 203 and steel plate 204 prevents the detection lever 201 from rocking.

When the transportation arm 36 then descends from this position to where the top of the media M touches the contact unit 201b on the end of the detection lever 201, a force pushing up is applied to the distal end of the detection lever 201. When this lifting force causes the mutually attracted magnet 203 and steel plate 204 to separate, the detection lever 201 pivots upward where the base end of the arm 201a joins the arm base 125a. The detection lever 201 is thus displayed from the media-not-detected position in contact with the arm base 125a to the media-detected position separated from the arm base 125a.

Conversely, when the gripping mechanism 130 releases its grip on the held disc M and the transportation arm 36 then rises and separates from the disc M, the detection lever 201 that was pivoted up to the media-detected position descends again due to its own weight. When the detection lever 201 swings down and is positioned to the media-not-detected position, the magnet 203 of the arm 201a contacts the steel plate 204, and the magnet 203 and steel plate 204 are mutually attracted due to the magnetic force of the magnet 203. As a result, the detection lever 201 is again held by the force of attraction between the magnet 203 and steel plate 204 so that the detection lever 201 does not move.

The operation whereby the media transportation mechanism 31 described above picks a disc M from a stack of media M is described next.

The actions whereby the topmost disc M is gripped and lifted from plural media M stored in a substantially coaxial stack in the blank media stacker 21 is described below.

First, with the transportation arm 36 positioned at a prescribed height directly above the blank media stacker 21, the solenoid 176 of the gripping mechanism 130 is energized. This causes the operating rod 176a of the solenoid 176 to pull in against the force of the internal spring. This movement of the operating rod 176a is transferred to the pivot arm 161, and the pivot arm 161 swings to a position rotated in the direction of arrow R2 in FIG. 16. This also causes the other pivot arms 162 and 163 to pivot in the same direction, thereby causing the fingers 141 to 143 on the ends of the support arms 161c to 163c of the three pivot arms 161 to 163 to move mutually together to the position enabling insertion to the center hole Ma of the media M.

The elevator drive motor 37 of the transportation arm 36 is then driven and the transportation arm 36 begins to descend. When the transportation arm 36 descends to near the top disc M, the media guide 133 of the gripping unit 132 is inserted to the center hole Ma of the media M. Even if the center of the media M in the blank media stacker 21 is offset from the center of the gripping unit 132 at this time, the inside surface Mb of the center hole Ma of the media M contacts the conical guide surface 135b, and the center of the media M is thus centered with the center of the media guide 133 by the guide surface 135b. The center hole Ma of the media M is then guided to the base end part 135a, and the base end part 135a is inserted to the center hole Ma of the media M. More specifically, the center of the gripped disc M is positioned to the center of the gripping unit 132, which is the center of the pickup.

When the contact unit 201b on the end of the detection lever 201 of the media detection mechanism 200 mounted on the transportation arm 36 contacts the surface of the disc M, the mutually attracted magnet 203 and steel plate 204 are pulled apart. The detection lever 201 pivots up in relationship to the transportation arm 36 in conjunction with the descent of the transportation arm 36, and moves from the media-not-detected position in contact with the arm base 125*a* to the media-detected position where the detection lever 201 is separated from the arm base 125*a*. As a result, the arm 201*a* of the detection lever 201 moves out of the detection area of the detector 202, the detector 202 therefore turns on, and a position near the disc M is detected. The transportation arm 36 is then lowered a prescribed distance and stopped with the fingers 141 to 143 of the gripping mechanism 130 assembled to the transportation arm 36 inserted to the center hole Ma of the media M.

The media M are stored stacked in the blank media stacker 21, and direct contact between adjacent media M in the stack can cause adjacent media to stick together.

Therefore, if the second disc M is stuck to the top disc M, shifting and positioning the top disc M to the side may be difficult using the fingers 141 to 143 simply pressed against the inside surface Mb of the center hole Ma of the media M.

The media transportation mechanism 31 therefore applies a prescribed amount of pressure to the top disc M from above, causing the guide surface 135*b* of the media guide 133 to apply pressure pushing the disc M to the side, reliably moving the disc M to the side, and positioning the gripping unit 132 in the disc M.

The relationship between the position of the belt clip 112 of the transportation arm 36 and the load on the media M is described next.

Figure 30:
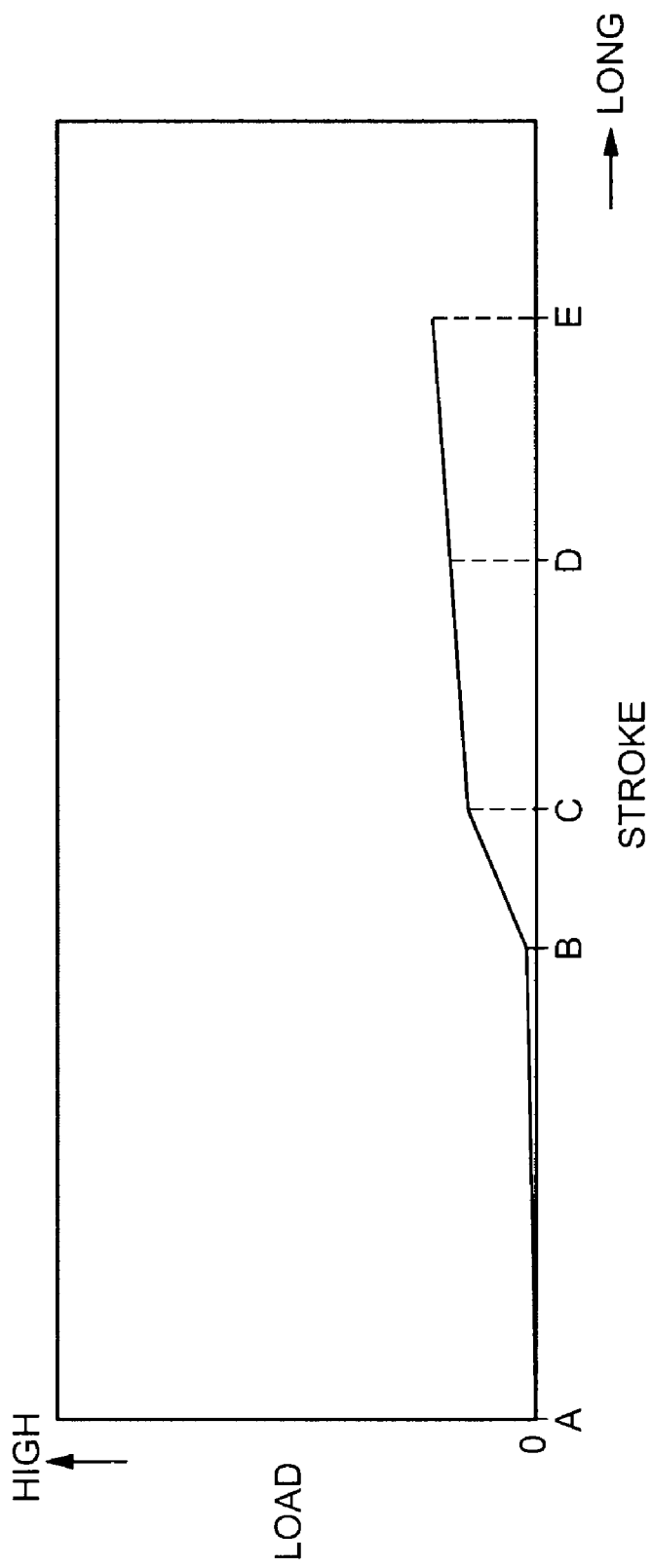
FIG. 30 is a graph showing the relationship between the down stroke of the belt clip of the transportation arm and the load on the media.

FIG. 30 is a graph showing the relationship between the down stroke of the belt clip of the transportation arm and the load on the media.

When driving the elevator drive motor 37 continues after the gripping unit 132 of the transportation arm 36 contacts the top disc M (at point A in FIG. 30), the belt clip 112 affixed to the timing belt 104 is pulled down in resistance to the urging force of the first tension spring 113, which is relatively weak, and the belt clip 112 descends a distance equal to the size of gap S. The belt clip 112 then contacts the pressure lever 116 (B in FIG. 30). A first elastic pressure is thus applied by the urging force of the weak first tension spring 113 from when the gripping unit 132 contacts the top disc M until the belt clip 112 contacts the pressure lever 116 (the period from A to B in FIG. 30).

If driving the elevator drive motor 37 continues, the belt clip 112 continues to descend. At this time, however, the belt clip 112 is in contact with the pressure lever 116, the downward force of the belt clip 112 is transferred to the transportation arm 36, the transportation arm 36 flexes, and this deflection of the transportation arm 36 applies pressure to the top disc M (from B to C in FIG. 30).

When the elevator drive motor 37 continues driving and the belt clip 112 descends further until the deflection force of the transportation arm 36 exceeds the force of the second tension spring 119 (C in FIG. 30), the pressure lever 116 pivots in resistance to the urging force of the second tension spring 119 using the support point of the support plate 117 as the pivot point. As a result, a second elastic pressure that is equal to the urging force of the first tension spring 113 plus the deflection force of the transportation arm 36 and the urging force of the second tension spring 119 is applied to the top disc M (C to E in FIG. 30).

The media transportation mechanism 31 with the load characteristic described above stops the elevator drive motor 37 at an appropriate position (such as at D in FIG. 30) in the range (C to E in FIG. 30) where the pressure applied to the media M is equal to the urging force of the first tension spring 113 plus the deflection force of the transportation arm 36 and the urging force of the second tension spring 119.

This enables applying a suitable load (approximately 10 N) to the top disc M in the stack of media M in the blank media stacker 21, and enables reliably shifting and positioning the disc M sideways using the guide surface 135*b* of the media guide 133 even if the second disc M is stuck to the top disc M.

Applying this load also enables reliably inserting and positioning the media guide 133 in the center hole Ma of the media M even if the disc M is off center.

If the transportation arm 36 is stiff and the spring constant of the transportation arm 36 is high, the same load can still be achieved with a shorter stroke of the belt clip 112 (the period from B to C in FIG. 30) when causing the transportation arm 36 to deflect.

When picking a disc M from the media tray 41*a*, 51 of the media drive 41 or label printer 11, which hold a single disc M, the disc M can be gripped by the gripping mechanism 130 using the first elastic pressure produced by the urging force of the weak first tension spring 113 from when the gripping unit 132 of the transportation arm 36 contacts the disc M until the belt clip 112 contacts the pressure lever 116 (from A to B in FIG. 30). This enables applying an extremely light load to the media tray 41*a*, 51 when picking up a disc M, and prevents problems from overloading the media tray 41*a* or 51.

As described above, after applying a prescribed second elastic pressure to the top disc M in the blank media stacker 21, the fingers 141 to 143 inserted to the center hole Ma of the media M are spread open radially to the center hole Ma and pushed against the inside surface Mb of the center hole Ma.

More specifically, when the solenoid 176 is de-energized and the force of the internal spring pushes the operating rod 176*a* out, the pivot arm 161 connected by the link 175 to the operating rod 176*a* pivots in the direction of arrow R1. The tension of the coil spring 174 causes the other two pivot arms 162 and 163 to pivot and rotate in the direction of arrow R1 in conjunction with pivot arm 161. As a result, the fingers 141 to 143 spread apart, the fingers 141 to 143 are pushed against the inside surface Mb of the center hole Ma of the media M, and the disc M is gripped.

The pivot arms 162 and 163 pivot independently of the pivot arm 161 in the direction of arrow R1 due to the force of the coil springs 174, causing the fingers 141 to 143 to move independently radially to the outside and be pressed against the inside surface Mb of the center hole Ma of the media M.

As a result, even if the center of the top disc M is offset from the pickup center, all of the fingers 141 to 143 contact the inside surface Mb of the center hole Ma of the media M because they spread independently of each other to the outside, and picking errors can thus be prevented.

Furthermore, because the length that the fingers 141 to 143 protrude down is less than or equal to the thickness of the media M being picked, picking errors caused by the fingers 141 to 143 contacting the edge of the center hole Ma in the second disc M are prevented even if the second disc M is off-center from the top disc M.

After thus gripping a disc M, the transportation arm 36 is raised with the fingers 141 to 143 pushing radially to the outside, thereby lifting the gripped disc M. Because the top disc M that is gripped is held firmly by all of the fingers 141 to 143, the disc M can be lifted smoothly and reliably.

When the transportation arm 36 rises in order to lift the disc M, the kick lever 182 of the kick-down mechanism 131 swings in the direction of arrow R3 in FIG. 21 pivoting at the connection point 181 so that the ejector 183 protrudes to the outside of the media guide 133.

If the second disc M is stuck to and rises with the top disc M when the top disc M is lifted off the stack, the ejector 183 of the vertical compound transfer gear 192 contacts the inside surface Mb of the center hole Ma in the second disc M, thereby reliably kicking the second disc M away so that only the top disc M is removed from the stack.

As described above, the detection lever 201 of the media detection mechanism 200 in the media transportation mechanism 31 according to this embodiment of the invention is attracted to the arm base 125a and held in the media-not-detected position by the attraction unit composed of the magnet 203 and steel plate 204, thereby preventing displacement of the detection lever 201 by inertia when the transportation arm 36 moves or by vibration or other noise when the gripping mechanism 130 is driven. Media picking and transportation errors caused by falsely detecting that a disc M is present regardless of whether a disc M is actually present can thus be reliably prevented.

Compared with an arrangement in which a spring or other urging member urges the detection lever 201 to the arm base 125a and holds the detection lever 201 in the media-not-detected position, the detection lever 201 is not pressed by an urging force against the disc M held by the gripping mechanism 130, and the gripping mechanism 130 is thus prevented from not getting a good grip on the disc M.

The media M can thus be transported without transportation errors, gripping errors, or other problems because the media detection mechanism 200 can accurately detect if a disc M is present.

Furthermore, by rendering an attraction unit using a magnet 203 and steel plate 204, a media detection mechanism 200 with good detection accuracy that is free of detection errors can be achieved at a low cost.

Furthermore, by using an easily moldable plastic magnet, the magnet 203 can easily be molded and shaped according to the installation, thereby lowering the manufacturing cost.

The publisher 1 described above can thus carry media M between the blank media stacker 21, the completed media stacker 22, the discard stacker 52, the media tray 41a of the media drive 41, and the media tray 51 of the label printer 11 using the transportation arm 36 of the media transportation mechanism 31 without transportation or picking errors, and thus affords a media processing device that can process media with high reliability.

The attraction unit of the foregoing embodiment is rendered with a magnet 203 positioned on the detection lever 201 and a steel plate 204 positioned on the arm base 125a, but this arrangement can be reversed with the steel plate 204 positioned on the detection lever 201 and the magnet 203 positioned on the arm base 125a. The steel piece described above as the attracted member is made of a material that exhibits magnetism when exposed to an external magnetic field, and includes magnetic stainless steel.

Furthermore, if the magnet 203 is positioned on the arm base 125a, the detection lever 201 itself could be steel. In addition, if the steel plate 204 is positioned on the arm base 125a, the detection lever 201 itself could be molded as a plastic magnet.

The attraction unit composed of the magnet 203 and steel plate 204 is preferably positioned on the distal end of an arm 201a of a detection lever 201 with a large moment. Thus disposing the attraction unit to the distal end part of the arm 201a enables the magnet to hold the detection lever more effectively.

The foregoing embodiment is described with the parts of the attraction unit pulled together and in contact when in the media-not-detected position, but an arrangement in which the magnet and attracted member do not touch and are positioned with a slight gap therebetween even in the media-not-detected position could be used. However, because the force of attraction is most effective when the attracted parts are touching, the magnet and attracted member preferably touch because of the ability to more effectively hold the detection lever in the media-not-detected position.

Figure 31:
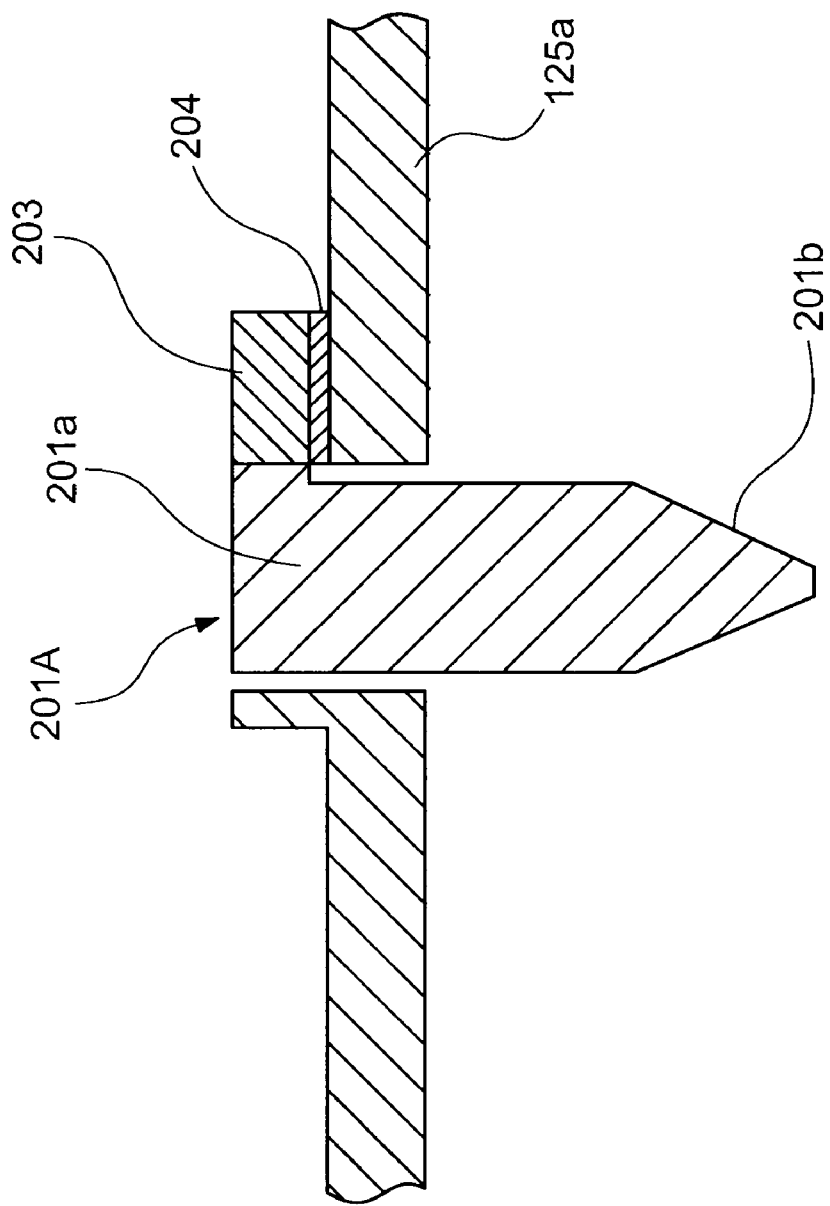
FIG. 31 is a section view showing another example of the detection lever.

The detection lever in the foregoing embodiment is supported freely pivotably on the transportation arm by a detection lever guide shaft (not described). As shown in FIG. 31, however, the detection lever 201A could be a long pin that is supported to move freely vertically to the arm base 125a of the transportation arm. In the arrangement shown in FIG. 31 the detection lever 201A has a long arm 201a and a contact unit 201b as the detector prod protruding below the bottom of the arm base 125a, and the magnet 203 projects horizontally from the arm 201a. A steel plate 204 is positioned on top of the arm base 125a as the attracted member. FIG. 31 shows the media-not-detected position. When the top of a disc touches the contact unit 201b and pushes the detection lever 201A vertically up, the magnet 203 and steel plate 204 are pulled apart and the detection lever 201A is displaced to the media-detected position.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media transportation mechanism comprising:
   a gripping mechanism that is positioned on a transportation arm and holds media; and
   a detection mechanism that detects if media is present in the gripping mechanism;
   wherein the detection mechanism includes
      a detection lever having a detection probe that can contact the media, the detection lever being displaceable from a media-not-detected position to a media-detected position when the detection probe touches the media,
      a detector that detects displacement of the detection lever to the media-detected position, and
      an attraction unit that pulls the detection lever to the media-not-detected position using magnetism.

2. The media transportation mechanism described in claim 1, wherein:
   the detection lever has the detection probe on one end and the other end is pivotably supported on the transportation arm.

3. The media transportation mechanism described in claim 1, wherein:
   the attraction unit comprises a magnet positioned on either a base plate of the transportation arm or the detection lever, and an attracted member that is attracted to the magnet and is positioned on the other of the base plate of the transportation arm and the detection lever.

4. The media transportation mechanism described in claim 3, wherein:
   the attraction unit and the attracted member are positioned away from each other when the gripping mechanism holds the media.

5. The media transportation mechanism described in claim 4, wherein:

the magnet and the attracted member of the attraction unit stick together when the detection lever is in the media-not-detected position.

6. The media transportation mechanism described in claim 3, wherein:
the magnet is a plastic magnet having a magnetic body mixed in plastic.

7. The media transportation mechanism described in claim 1, wherein:
the media-not-detected position is a position where the detection probe protrudes from the transportation arm to the side on which the media is held, and the media-detected position is a position where protrusion of the detection probe is less than in the media-not-detected position.

8. A media processing device comprising:
the media transportation mechanism described in claim 1;
a media storage unit; and
a media processing unit.

9. A media processing device comprising:
a media processing unit that prints on media;
a media storage unit that stores at least one medium; and
a media transportation mechanism that transports media from the media storage unit to the media processing unit;
wherein the media transportation mechanism includes
a gripping mechanism that is positioned on a transportation arm and holds media, and
a detection mechanism that detects if media is present in the gripping mechanism; and
the detection mechanism includes
a detection lever having a detection probe that can contact the media, the detection lever being displaceable from a media-not-detected position to a media-detected position when the detection probe touches the media,
a detector that detects displacement of the detection lever to the media-detected position, and
an attraction unit that attracts the detection lever to the media-not-detected position using magnetic force.

10. The media processing device described in claim 9, wherein:
the detection probe can contact the media, and can move to a media-not-detected position where the detection probe protrudes from the gripping mechanism to a side where the media is held, and to a media-detected position where protrusion of the detection probe is less than in the media-not-detected position.

11. The media processing device described in claim 9, wherein:
the attraction unit comprises a magnet positioned on either a base plate of the media transportation mechanism or the detection lever, and an attracted member that is attracted to the magnet and is positioned on the other of the base plate of the media transportation mechanism and the detection lever.

12. The media processing device described in claim 11, wherein:
the magnet and the attracted member of the attraction unit stick together when the detection lever is in the media-not-detected position.

* * * * *